(12) United States Patent
Hisamura et al.

(10) Patent No.: US 11,339,240 B2
(45) Date of Patent: May 24, 2022

(54) CONJUGATED DIENE-BASED POLYMER, BRANCHING AGENT, PRODUCTION METHOD FOR CONJUGATED DIENE-BASED POLYMER, EXTENDED CONJUGATED DIENE-BASED POLYMER, RUBBER COMPOSITION, AND TIRE

(71) Applicant: Asahi Kasei Kabushiki Kaisha, Tokyo (JP)

(72) Inventors: Kenta Hisamura, Tokyo (JP); Miho Yamamoto, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 0 days.

(21) Appl. No.: 17/042,230

(22) PCT Filed: Jul. 31, 2019

(86) PCT No.: PCT/JP2019/029980
§ 371 (c)(1),
(2) Date: Sep. 28, 2020

(87) PCT Pub. No.: WO2020/070961
PCT Pub. Date: Apr. 9, 2020

(65) Prior Publication Data
US 2021/0214484 A1 Jul. 15, 2021

(30) Foreign Application Priority Data
Oct. 3, 2018 (JP) .............................. JP2018-188604

(51) Int. Cl.
| C08F 236/10 | (2006.01) |
| C08L 47/00 | (2006.01) |
| C08L 15/02 | (2006.01) |
| C08K 3/04 | (2006.01) |
| C08K 3/36 | (2006.01) |
| B60C 1/00 | (2006.01) |

(52) U.S. Cl.
CPC .......... *C08F 236/10* (2013.01); *B60C 1/0016* (2013.01); *C08K 3/04* (2013.01); *C08K 3/36* (2013.01); *C08L 15/02* (2013.01); *C08L 47/00* (2013.01)

(58) Field of Classification Search
CPC ........ C08F 236/10; C08L 47/00; C08L 15/02; C08K 3/04; C08K 3/36
USPC ........................................................ 524/534
See application file for complete search history.

(56) References Cited

U.S. PATENT DOCUMENTS

| 2005/0182191 A1 | 8/2005 | Lee et al. |
| 2018/0066076 A1 | 3/2018 | Kyo et al. |
| 2019/0184747 A1 | 6/2019 | Kyo et al. |
| 2019/0203021 A1 | 7/2019 | Kyo et al. |
| 2020/0031975 A1 | 1/2020 | Hasebe et al. |

FOREIGN PATENT DOCUMENTS

| CN | 105837751 A | 8/2016 | |
| DE | 1079322 B | 4/1960 | |
| EP | 2003146 A1 | 12/2008 | |
| EP | 3260471 A1 | 12/2017 | |
| EP | 3502145 A1 | 6/2019 | |
| JP | H11-189616 A | 7/1999 | |
| JP | 2003-171418 A | 6/2003 | |
| JP | 2005-290355 A | 10/2005 | |
| JP | 2009-263574 A | 11/2009 | |
| JP | 2011-089086 A | 5/2011 | |
| JP | 201189086 | * 5/2011 | |
| JP | 2018-119105 A | 8/2018 | |
| RU | 2016127309 A | 1/2018 | |
| WO | 2007/114203 A1 | 10/2007 | |
| WO | 2015/086039 A1 | 6/2015 | |
| WO | 2016/133154 A1 | 8/2016 | |
| WO | WO-2016133154 A1 | * 8/2016 | ............. C08K 3/013 |
| WO | 2018/034194 A1 | 2/2018 | |
| WO | 2018/034195 A1 | 2/2018 | |
| WO | 2018/034217 A1 | 2/2018 | |
| WO | 2018/164053 A1 | 9/2018 | |

OTHER PUBLICATIONS

Notice of Reasons for Refusal issued in corresponding Japanese Patent Application No. 2020-549985 dated Dec. 1, 2020.
Decision to Grant issued in corresponding Japanese Patent Application No. 2020-549985 dated Mar. 19, 2021.
International Search Report issued in corresponding International Patent Application No. PCT/JP2019/029980 dated Oct. 8, 2019.
Provisional Specification titled Modified Conjugated Diene Polymer and Process for Producing Thereof, Asahi Kasei Chemicals Corporation (2009).
International Preliminary Report on Patentability and Written Opinion issued in corresponding International Patent Application No. PCT/JP2019/029980 dated Apr. 15, 2021.
Hirao et al., "Polymerization of Monomers Containing Functional Silyl Groups. 1. Anionic Living Polymerization of (4-Vinylphenyl)dimethyl-2-propoxysilane," Macromolecules, 18: 2101-2105 (1985).
Ohishi et al., "Living Anionic Polymerization of [alpha]-Methyleneindane: An Exo-Methylene Hydrocarbon Monomer," Macromolecules, 48 (19): 6900-6908 (2015).

(Continued)

*Primary Examiner* — Deve V Hall
(74) *Attorney, Agent, or Firm* — Morgan, Lewis & Bockius LLP

(57) ABSTRACT

A conjugated diene-based polymer of the present invention has an absolute molecular weight measured by viscosity detector-equipped GPC-light scattering measurement, of $40 \times 10^4$ or more and $5000 \times 10^4$ or less, has a branching number (Bn) measured by the viscosity detector-equipped GPC-light scattering measurement, of 8 or more, and has a modification ratio of 60% by mass or more.

18 Claims, No Drawings

(56) References Cited

OTHER PUBLICATIONS

Kobayashi et al., "Synthesis of Well-Defined Poly(N,N-diethylacrylamide)s End-Functionalized with Methacrylamide Structure by Means of Anionic Polymerization," Polymer Journal, 36 (3): 238-247 (2004).
Lewis, "Preparation and Properties of Styrenyl-Substituted Organosilicon Compounds," The Journal of Organic Chemistry, 23 (12) 1893-1895 (1958).
European Search Report issued in corresponding European Patent Application No. 19869631.2 dated Nov. 22, 2021.

* cited by examiner

CONJUGATED DIENE-BASED POLYMER, BRANCHING AGENT, PRODUCTION METHOD FOR CONJUGATED DIENE-BASED POLYMER, EXTENDED CONJUGATED DIENE-BASED POLYMER, RUBBER COMPOSITION, AND TIRE

TECHNICAL FIELD

The present invention relates to a conjugated diene-based polymer, a branching agent, a production method for a conjugated diene-based polymer, an extended conjugated diene-based polymer, a rubber composition, and a tire.

BACKGROUND ART

There have been increasing demands for reduction of fuel consumption in vehicles, and improvement of materials of a vehicle tire, particularly, of a tire tread in contact with the ground is required.

Recently, development of a material having low rolling resistance, namely, having a low hysteresis loss property, has been demanded.

Besides, in order to reduce the weight of a tire, it is necessary to reduce the thickness of a tread portion of the tire, and there is a demand also for a material having high abrasion resistance.

On the other hand, a material used for a tire tread is required, from the viewpoint of safety, to be excellent in wet skid resistance and have practically sufficient fracture performance.

An example of a rubber material meeting the aforementioned requirements includes a rubber material containing a rubber-like polymer and a reinforcing filler such as carbon black or silica.

When a rubber material containing silica is used, balance between a low hysteresis loss property and wet skid resistance can be improved. Besides, an attempt has been made to reduce a hysteresis loss by improving dispersibility of silica in a rubber material through introduction of a functional group having affinity or reactivity with silica into a molecular end of a rubber-like polymer having high mobility, and further by reducing the mobility of the molecular end of the rubber-like polymer through a bond to a silica particle.

For example, Patent Documents 1 to 3 propose a composition of a modified conjugated diene-based polymer obtained by reacting an alkoxysilane having an amino group with a conjugated diene-based polymer active end, and silica.

Besides, Patent Document 4 proposes a modified conjugated diene-based polymer obtained by a coupling reaction of a polymer active end and a polyfunctional silane compound.

LIST OF PRIOR ART DOCUMENTS

Patent Document

Patent Document 1: Japanese Patent Laid-Open No. 2005-290355
Patent Document 2: Japanese Patent Laid-Open No. 11-189616
Patent Document 3: Japanese Patent Laid-Open No. 2003-171418
Patent Document 4: International Publication No. WO07/114203

SUMMARY OF INVENTION

Problems to be Solved by Invention

Silica has, however, a disadvantage of being inferior in dispersibility in a composition to carbon black because it has a hydrophilic surface and hence has low affinity with a conjugated diene-based polymer while carbon black has a hydrophobic surface. Therefore, a composition containing silica needs to additionally contain a silane modifier or the like to improve the dispersibility of silica in the composition by imparting a bond between the silica and the conjugated diene-based polymer.

Besides, when a functional group having high reactivity with silica is introduced into a molecular end of the conjugated diene-based polymer, there is a problem that processability tends to be degraded, for example, it becomes difficult to knead because a reaction with a silica particle proceeds during kneading process to increase the viscosity of a resultant composition, or surface coarseness or sheet breakage is easily caused when formed into a sheet after the kneading.

In addition, when such a composition is used to obtain a vulcanizate, in particular, used to obtain a vulcanizate containing an inorganic filler such as silica, it has a problem that the balance between a low hysteresis loss property and wet skid resistance, and abrasion resistance are not sufficient.

Therefore, an object of the present invention is to provide a conjugated diene-based polymer that is extremely excellent in processability obtained when used for obtaining a vulcanizate, and when in the form of a vulcanizate, is excellent in balance between a low hysteresis loss property and wet skid resistance and in abrasion resistance, and has practically sufficient fracture performance.

Means for Solving Problems

The present inventors have studied earnestly to solve the above-described problems of the related arts, consequently found that a conjugated diene-based polymer having an absolute molecular weight falling in a prescribed range, and having a branch number (Bn) falling in a specific range is extremely excellent in processability obtained when used for obtaining a vulcanizate, and when in the form of a vulcanizate, is excellent in balance between a low hysteresis loss property and wet skid resistance and in abrasion resistance, and has practically sufficient fracture performance, and completed the present invention.

Specifically, the present invention provides the following:

[1] A conjugated diene-based polymer having an absolute molecular weight measured by viscosity detector-equipped GPC-light scattering measurement, of $40 \times 10^4$ or more and $5000 \times 10^4$ or less, and having a branching number (Bn) measured by the viscosity detector-equipped GPC-light scattering measurement, of 8 or more.

[2] The conjugated diene-based polymer according to [1] above, having a modification ratio of 60% by mass or more.

[3] The conjugated diene-based polymer according to [1] or [2] above, wherein the conjugated diene-based polymer has a star polymer structure having 3 or more branches, wherein
at least one branched chain of the star structure comprises a portion derived from a vinyl-based monomer containing an alkoxysilyl group or a halosilyl group, and the portion derived from the vinyl-based monomer containing the alkoxysilyl group or the halosilyl group further comprises a main chain branch structure.

[4] The conjugated diene-based polymer according to any one of [1] to [3] above, wherein the portion derived from the vinyl-based monomer containing the alkoxysilyl group or the halosilyl group is a monomer unit based on a compound represented by the following formula (1) or (2), and contains a branch point of a polymer chain containing the monomer unit based on the compound represented by the formula (1) or (2), and at least one end of the conjugated diene-based polymer is coupled by using a coupling agent:

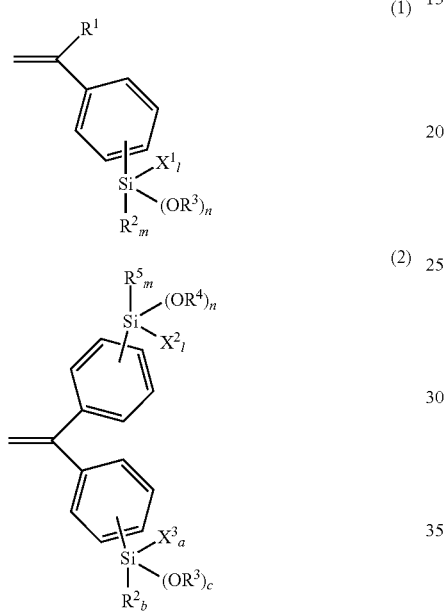

wherein in the formula (1), $R^1$ represents a hydrogen atom, an alkyl group having 1 to 20 carbon atoms, or an aryl group having 6 to 20 carbon atoms, and may have a branch structure in a part thereof;

$R^2$ and $R^3$ each independently represent an alkyl group having 1 to 20 carbon atoms, or an aryl group having 6 to 20 carbon atoms, and may have a branch structure in a part thereof;

each of $R^1$ to $R^3$, if present in a plural number, is respectively independent;

$X^1$ represents an independent halogen atom;

m represents an integer of 0 to 2, n represents an integer of 0 to 3, l represents an integer of 0 to 3, and (m+n+l) is 3;

in the formula (2), $R^2$ to $R^5$ each independently represent an alkyl group having 1 to 20 carbon atoms, or an aryl group having 6 to 20 carbon atoms, and may have a branch structure in a part thereof, and each of $R^2$ to $R^5$, if present in a plural number, is respectively independent;

$X^2$ and $X^3$ represent an independent halogen atom;

m represents an integer of 0 to 2, n represents an integer of 0 to 3, l represents an integer of 0 to 3, and (m+n+l) is 3; and a represents an integer of 0 to 2, b represents an integer of 0 to 3, c represents an integer of 0 to 3, and (a+b+c) is 3.

[5] The conjugated diene-based polymer according to [4] above, containing a monomer unit based on a compound represented by the formula (1) wherein $R^1$ is a hydrogen atom, and m is 0.

[6] The conjugated diene-based polymer according to [4] above, containing a monomer unit based on a compound represented by the formula (2) wherein m is 0 and b is 0.

[7] The conjugated diene-based polymer according to [4] above, containing a monomer unit based on a compound represented by the formula (1) wherein $R^1$ is a hydrogen atom, m is 0, and l is 0.

[8] The conjugated diene-based polymer according to [4] above, containing a monomer unit based on a compound represented by the formula (2) wherein m is 0, l is 0, a is 0, and b is 0.

[9] The conjugated diene-based polymer according to [4] above, containing a monomer unit based on a compound represented by the formula (1) wherein $R^1$ is a hydrogen atom, l is 0, and n is 3.

[10] A branching agent for the conjugated diene-based polymer according to [4] above, wherein the branching agent is a compound represented by the following formula (1) or (2):

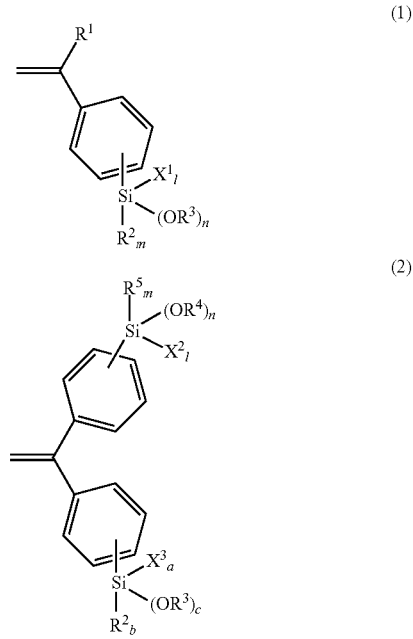

wherein in the formula (1), $R^1$ represents a hydrogen atom, an alkyl group having 1 to 20 carbon atoms, or an aryl group having 6 to 20 carbon atoms, and may have a branch structure in a part thereof;

$R^2$ and $R^3$ each independently represent an alkyl group having 1 to 20 carbon atoms, or an aryl group having 6 to 20 carbon atoms, and may have a branch structure in a part thereof;

each of $R^1$ to $R^3$, if present in a plural number, is respectively independent;

$X^1$ represents an independent halogen atom;

m represents an integer of 0 to 2, n represents an integer of 0 to 3, l represents an integer of 0 to 3, and (m+n+l) is 3;

in the formula (2), $R^2$ to $R^5$ each independently represent an alkyl group having 1 to 20 carbon atoms, or an aryl group having 6 to 20 carbon atoms, and may have a branch structure in a part thereof, and each of $R^2$ to $R^5$, if present in a plural number, is respectively independent;

$X^2$ and $X^3$ represent an independent halogen atom;

m represents an integer of 0 to 2, n represents an integer of 0 to 3, l represents an integer of 0 to 3, and (m+n+l) is 3; and a represents an integer of 0 to 2, b represents an integer of 0 to 3, c represents an integer of 0 to 3, and (a+b+c) is 3.

[11] The branching agent according to [10] above, wherein the branching agent is a compound represented by the formula (1) wherein $R^1$ is a hydrogen atom and m is 0.

[12] The branching agent according to [10] above, wherein the branching agent is a compound represented by the formula (2) wherein m is 0, and b is 0.

[13] The branching agent according to [10] above, wherein the branching agent is a compound represented by the formula (1) wherein $R^1$ is a hydrogen atom, m is 0, and l is 0.

[14] The branching agent according to [10] above, wherein the branching agent is a compound represented by the formula (2) wherein m is 0, l is 0, a is 0, and b is 0.

[15] The branching agent according to [10] above, wherein the branching agent is a compound represented by the formula (1) wherein $R^1$ is a hydrogen atom, l is 0, and n is 3.

[16] A method for producing the conjugated diene-based polymer according to any one of [1] to [9] above, comprising:

a polymerizing/branching step of polymerizing at least a conjugated diene compound in the presence of an organic lithium-based compound to obtain a conjugated diene-based polymer having a main chain branch structure by using the branching agent according to any one of [10] to [15] above; and a step of coupling the conjugated diene-based polymer by using a coupling agent, and/or a step of modifying the conjugated diene-based polymer with a modifier having a nitrogen atom-containing group.

[17] The method for producing the conjugated diene-based polymer according to [16] above, wherein the modifier contains a modifier represented by any one of the following general formulas (A) to (C):

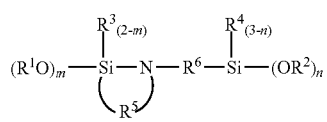
(A)

wherein $R^1$ to $R^4$ each independently represent an alkyl group having 1 to 20 carbon atoms or an aryl group having 6 to 20 carbon atoms, $R^5$ represents an alkylene group having 1 to 10 carbon atoms, $R^6$ represents an alkylene group having 1 to 20 carbon atoms, m represents an integer of 1 or 2, n represents an integer of 2 or 3, (m+n) is an integer of 4 or more, and each of $R^1$ to $R^4$, if present in a plural number, is respectively independent.

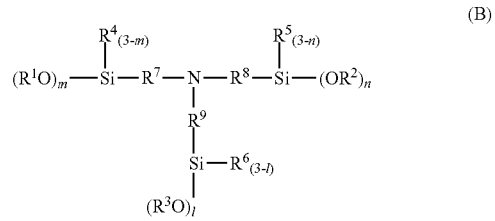
(B)

wherein $R^1$ to $R^6$ each independently represent an alkyl group having 1 to 20 carbon atoms or an aryl group having 6 to 20 carbon atoms, $R^7$ to $R^9$ each independently represent an alkylene group having 1 to 20 carbon atoms, m, n, and l each independently represent an integer of 1 to 3, (m+n+l) is an integer of 4 or more, and each of $R^1$ to $R^6$, if present in a plural number, is respectively independent.

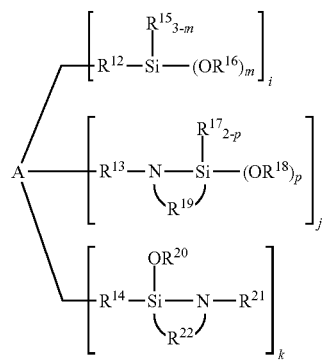
(C)

wherein $R^{12}$ to $R^{14}$ each independently represent a single bond or an alkylene group having 1 to 20 carbon atoms, $R^{15}$ to $R^{19}$ and $R^{20}$ each independently represent an alkyl group having 1 to 20 carbon atoms, $R^{19}$ and $R^{22}$ each independently represent an alkylene group having 1 to 20 carbon atoms, $R^{21}$ represents an alkyl group or a trialkyl silyl group having 1 to 20 carbon atoms, m represents an integer of 1 to 3, p represents 1 or 2, each of $R^{12}$ to $R^{22}$, m and p, if present in a plural number, is respectively independent, and may be the same or different, i represents an integer of 0 to 6, j represents an integer of 0 to 6, k represents an integer of 0 to 6, (i+j+k) is an integer of 4 to 10, and A represents a hydrocarbon group having 1 to 20 carbon atoms, or an organic group having at least one atom selected from the group consisting of an oxygen atom, a nitrogen atom, a silicon atom, a sulfur atom, and a phosphorus atom, and not having active hydrogen.

[18] The production method for the conjugated diene-based polymer according to [17] above, wherein A is represented by any one of the following general formulas (II) to (V) in the formula (C):

(II)

wherein $B^1$ represents a single bond or a hydrocarbon group having 1 to 20 carbon atoms, a represents an integer of 1 to 10, and $B^1$, if present in a plural number, is respectively independent;

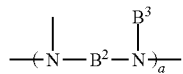

(III)

wherein $B^2$ represents a single bond or a hydrocarbon group having 1 to 20 carbon atoms, $B^3$ represents an alkyl group having 1 to 20 carbon atoms, a represents an integer of 1 to 10, and each of $B^2$ and $B^3$, if present in a plural number, is respectively independent;

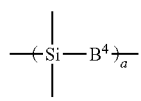

(IV)

wherein $B^4$ represents a single bond or a hydrocarbon group having 1 to 20 carbon atoms, a represents an integer of 1 to 10, and $B^4$, if present in a plural number, is respectively independent; and

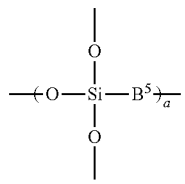

(V)

wherein $B^5$ represents a single bond or a hydrocarbon group having 1 to 20 carbon atoms, a represents an integer of 1 to 10, and $B^5$, if present in a plural number, is respectively independent.

[19] An extended conjugated diene-based polymer comprising:

100 parts by mass of the conjugated diene-based polymer according to any one of [1] to [9] above; and 1 to 60 parts by mass of at least one selected from the group consisting of an extender oil, a liquid rubber, and a resin.

[20] A rubber composition comprising:

a rubber component; and 5.0 parts by mass or more and 150 parts by mass or less of a filler based on 100 parts by mass of the rubber component, wherein the rubber component contains, based on a total amount of the rubber component, 10% by mass or more of the conjugated diene-based polymer according to any one of [1] to [9] above, or the extended conjugated diene-based polymer according to [19] above.

[21] A tire comprising the rubber composition according to [20] above.

Advantages of Invention

According to the present invention, a conjugated diene-based polymer that is extremely excellent in processability obtained when used for obtaining a vulcanizate, and when in the form of a vulcanizate, can realize excellent balance between a low hysteresis loss property and wet skid resistance, has high abrasion resistance, and has practically sufficient fracture performance can be obtained.

MODE FOR CARRYING OUT INVENTION

Now, an embodiment for practicing the present invention (hereinafter referred to as the "present embodiment") will be described in detail.

It is noted that the following present embodiment is merely an example for describing the present invention and the present invention is not limited to the following description but may be variously modified within the scope thereof.

[Conjugated Diene-Based Polymer]

A conjugated diene-based polymer of the present embodiment has an absolute molecular weight, obtained by viscosity detector-equipped GPC-light scattering measurement, of $40 \times 10^4$ or more and $5000 \times 10^4$ or less, and a branch number (Bn), obtained by the viscosity detector-equipped GPC-light scattering measurement, of 8 or more.

A conjugated diene-based polymer specified in the absolute molecular weight and the branch number as described above is extremely excellent in processability obtained when used for obtaining a vulcanizate, and when in the form of a vulcanizate, is excellent in balance between a low hysteresis loss property and wet skid resistance and in abrasion resistance, and has practically sufficient fracture performance.

The conjugated diene-based polymer of the present embodiment has a modification ratio of preferably 60% by mass or more.

A modified conjugated diene-based polymer specified in the absolute molecular weight, the branch number and the modification ratio as described above is extremely excellent in processability obtained when used for obtaining a vulcanizate, and when in the form of a vulcanizate, is particularly excellent in balance between a low hysteresis loss property and wet skid resistance, and has excellent abrasion resistance and practically sufficient fracture performance.

It is noted that the "conjugated diene-based polymer" herein encompasses a modified conjugated diene-based polymer obtained after modification unless otherwise stated.

(Absolute Molecular Weight)

From the viewpoints of processability, balance between a low hysteresis loss property and wet skid resistance, abrasion resistance, and fracture performance, the conjugated diene-based polymer of the present embodiment has an absolute molecular weight, obtained by viscosity detector-equipped GPC-light scattering measurement, of $40 \times 10^4$ or more and $5000 \times 10^4$ or less.

In general, a polymer having a branch structure tends to have a smaller molecule when compared with a straight-chain polymer having the same molecular weight. Therefore, in employing a molecular weight in terms of polystyrene obtained by gel permeation chromatography (GPC), which is relative comparison with a standard polystyrene sample for screening a polymer in accordance with the size of a molecule, the molecular weight of a polymer having a branch structure tends to be underestimated.

On the other hand, as for an absolute molecular weight measured by viscosity detector-equipped GPC-light scattering measurement, a molecular weight (absolute molecular weight) is measured by directly observing the size of a molecule by a light scattering method, and hence, as compared with a molecular weight in terms of polystyrene obtained by gel permeation chromatography (GPC), is not affected by a structure of the polymer or interaction with a column filler. Therefore, the molecular weight can be accurately measured without being affected by a polymer structure such as a branch structure of a conjugated diene-based polymer.

The absolute molecular weight of the conjugated diene-based polymer of the present embodiment is $40 \times 10^4$ or more, preferably $50 \times 10^4$ or more, more preferably $60 \times 10^4$ or more, further preferably $80 \times 10^4$ or more, and still further preferably $100 \times 10^4$ or more.

The absolute molecular weight of the conjugated diene-based polymer of the present embodiment is $5000 \times 10^4$ or less, preferably $4500 \times 10^4$ or less, more preferably $4000 \times 10^4$ or less, further preferably $3500 \times 10^4$ or less, and still further preferably $3000 \times 10^4$ or less.

When the absolute molecular weight is $40 \times 10^4$ or more, balance between a low hysteresis loss property and wet skid resistance, and abrasion resistance when in the form of a vulcanizate are excellent. When the absolute molecular weight is $5000 \times 10^4$ or less, processability obtained when used for obtaining a vulcanizate and dispersibility of a filler are excellent, and practically sufficient fracture performance can be obtained.

The absolute molecular weight of the conjugated diene-based polymer can be measured by a method described in examples below.

The absolute molecular weight of the conjugated diene-based polymer of the present embodiment can be controlled to fall in the above-described numerical range by adjusting an amount of a polymerization initiator to be added, the number of functional groups of a branching agent, an amount of the branching agent to be added, timing of adding the branching agent, and amounts of a coupling agent and a modifier to be added.

(Branch Number)

From the viewpoints of processability, balance between a low hysteresis loss property and wet skid resistance, abrasion resistance, and fracture performance, the branch number (Bn) of the conjugated diene-based polymer of the present embodiment is 8 or more.

The branch number (Bn) being 8 or more means that the conjugated diene-based polymer of the present embodiment has 8 or more polymer chains as side chains with respect to a substantially longest polymer main chain.

The branch number (Bn) of a conjugated diene-based polymer is defined, by using a contracting factor (g') measured by viscosity detector-equipped GPC-light scattering measurement, as $g'=6Bn/\{(Bn+1)(Bn+2)\}$.

In general, a polymer having a branch tends to have a smaller molecule when compared with a straight-chain polymer having the same absolute molecular weight.

The contracting factor (g') is an index of a size ratio occupied by a molecule in a straight-chain polymer assumed to have the same absolute molecular weight. In other words, when the branch number of a polymer is increased, the contracting factor (g') tends to be reduced.

For the contracting factor, an intrinsic viscosity is used as an index of the size of a molecule in this embodiment, and a straight-chain polymer satisfies the relationship: intrinsic viscosity $[\eta]=-3.883 M^{0.771}$, wherein M represents an absolute molecular weight.

The contracting factor (g') expresses, however, a decreasing ratio of the size of a molecule and does not accurately express a branch structure of the polymer.

Therefore, the branch number (Bn) of the conjugated diene-based polymer is calculated by using a value of the contracting factor (g') obtained at each absolute molecular weight of the conjugated diene-based polymer. The thus calculated "branch number (Bn)" accurately expresses the number of polymers directly or indirectly bonded to a longest main chain structure.

The calculated branch number (Bn) can be an index expressing a branch structure of a conjugated diene-based polymer. For example, in a general 4-branched star polymer (having 4 polymer chains connected to a center portion), two polymer chain arms are bonded to a longest highly branched main chain structure, and hence the branch number (Bn) is evaluated as 2.

In a general 8-branched star polymer, 6 polymer chain arms are bonded to a longest highly branched main chain structure, and the branch number (Bn) is evaluated as 6.

The conjugated diene-based polymer of the present embodiment has the branch number (Bn) of 8 or more, and such a case means that it is a conjugated diene-based polymer having, as a star polymer structure, branches similar to a 10-branched star polymer structure.

Here, a "branch" is formed by a direct or indirect bond of one polymer to another polymer. Besides, the "branch number (Bn)" corresponds to the number of polymers directly or indirectly bonded to a longest main chain structure.

When the branch number (Bn) is 8 or more, the conjugated diene-based polymer of the present embodiment is excellent in balance between a low hysteresis loss property and wet skid resistance when in the form of a vulcanizate.

In general, increase of an absolute molecular weight tends to deteriorate processability, and when an absolute molecular weight is increased in a straight chain polymer structure, a vulcanizate obtained therefrom is largely increased in the viscosity and largely deteriorated in the processability. Therefore, even when a large number of functional groups are introduced into the polymer to improve affinity and/or reactivity with silica to be blended as a filler, the silica cannot be sufficiently dispersed in the polymer in kneading process. As a result, the function of the introduced functional groups cannot be exhibited, and hence, an originally expected effect of improving a low hysteresis loss property and wet skid resistance by the introduction of the functional groups cannot be exhibited.

On the other hand, since the conjugated diene-based polymer of the present embodiment is specified to have a branch number (Bn) of 8 or more, the increase of the viscosity of a vulcanizate obtained therefrom due to increase of the absolute molecular weight is largely suppressed, and hence the polymer can be sufficiently mixed with silica or the like in the kneading process, so that the silica can be dispersed around the conjugated diene-based polymer. As a result, abrasion resistance and fracture performance can be improved by setting a molecular weight of the conjugated diene-based polymer to be high, and in addition, silica can be dispersed around the polymer by sufficient kneading so as to make functional groups to act and/or react, and thus, the polymer can attain practically sufficient low hysteresis loss property and wet skid resistance.

The absolute molecular weight of the conjugated diene-based polymer can be measured by a method described in the examples below.

The branch number (Bn) of the conjugated diene-based polymer of the present embodiment is 8 or more, preferably 10 or more, more preferably 12 or more, and further preferably 15 or more.

A conjugated diene-based polymer having a branch number (Bn) falling in this range tends to be excellent in processability obtained when used for obtaining a vulcanizate.

The upper limit of the branch number (Bn) is not especially limited, and may be equal to or larger than a detection limit, and is preferably 84 or less, more preferably 80 or less, further preferably 64 or less, and still further preferably 57 or less.

If the branch number is 84 or less, abrasion resistance obtained when used for obtaining a vulcanizate tends to be excellent.

The branch number of the conjugated diene-based polymer can be controlled to be 8 or more in accordance with a combination of an amount of a branching agent to be added and an amount of an end modifier to be added. Specifically, the branch number can be controlled in accordance with the number of functional groups of a branching agent, an amount of the branching agent to be added, timing of adding the branching agent, and an amount of a modifier to be added. More specific description will be given in [Production Method for Conjugated Diene-based Polymer] described below.

(Modification Ratio)

From the viewpoints of processability, balance between a low hysteresis loss property and wet skid resistance, abrasion resistance, and fracture performance, the conjugated diene-based polymer of the present embodiment preferably has a modification ratio of 60% by mass or more based on a total amount of conjugated diene-based polymers.

Herein, the term "modification ratio" refers to a mass ratio of a conjugated diene-based polymer having a nitrogen-containing functional group to a total amount of conjugated diene-based polymers.

For example, assuming that a nitrogen-containing modifier is reacted with a terminal end, a mass ratio of a conjugated diene-based polymer having a nitrogen-containing functional group owing to the nitrogen-containing modifier to a total amount of conjugated diene-based polymers is expressed as a modification ratio.

On the other hand, also when a polymer is branched by using a branching agent containing nitrogen, the thus generated conjugated diene-based polymer has a nitrogen-containing functional group, and such a branched polymer is also counted in calculation of a modification ratio.

In other words, herein, when a conjugated diene-based polymer is particularly a "modified conjugated diene-based polymer" having been modified, a mass ratio of a sum of a coupling polymer obtained by using a modifier having a nitrogen-containing functional group and/or a branched polymer obtained by using a branching agent having a nitrogen-containing functional group corresponds to the modification ratio.

The modification ratio is preferably 65% by mass or more, more preferably 70% by mass or more, further preferably 75% by mass or more, still further preferably 80% by mass or more, and much further preferably 82% by mass or more.

If the modification ratio is 60% by mass or more, the resultant polymer tends to be excellent in processability obtained when used for obtaining a vulcanizate, and be more excellent in abrasion resistance and a low hysteresis loss property when in the form of a vulcanizate.

The modification ratio can be measured by chromatography capable of separating a functional group-containing modified component and a non-modified component.

As a method using chromatography, a method using a column for gel permeation chromatography using, as a filler, a polar material such as silica adsorbing a specific functional group, for performing quantitative determination using an internal standard of a non-adsorbed component can be employed.

More specifically, the modification ratio is obtained by measuring an amount of adsorption onto a silica column based on a difference between a chromatogram measured by using a polystyrene-based gel column and a chromatogram measured by using a silica-based column obtained from a sample solution containing a sample and low molecular weight internal standard polystyrene. More specifically, the modification ratio is measured by a method described in the examples below.

In the conjugated diene-based polymer of the present embodiment, the modification ratio can be controlled by adjusting an amount of a modifier to be added and a reaction method, and thus can be controlled to be 60% by mass or more.

For example, a method in which polymerization is performed by using, as a polymerization initiator, an organic lithium compound, described later, having at least one nitrogen atom in a molecule, a method in which a monomer having at least one nitrogen atom in a molecule is copolymerized, and a method in which a modifier having a structural formula described later is used are combined, and polymerization conditions are controlled, and thus, the modification ratio can be obtained.

From the viewpoints of processability and abrasion resistance balance, the conjugated diene-based polymer of the present embodiment is preferably a conjugated diene-based polymer having a star polymer structure having 3 or more branches, in which at least one branched chain of the star structure comprises a portion derived from a vinyl-based monomer containing an alkoxysilyl group or a halosilyl group, and the portion derived from the vinyl-based monomer containing the alkoxysilyl group or the halosilyl group further comprises a main chain branch structure.

Herein, the term "star polymer structure" refers to a structure in which a plurality of polymer chains (arms) are bonded to one central branch point.

The one central branch point herein contains a "substituent containing an atom derived from a coupling agent" or a "substituent containing a nitrogen atom derived from a modifier".

The term "main branch structure" herein refers to a structure in which a polymer chain forms a branch point in the portion derived from a vinyl-based monomer containing an alkoxysilyl group or a halosilyl group, and a polymer chain (arm) extends from the branch point.

In the conjugated diene-based polymer of the present embodiment, from the viewpoint of improving the branch number Bn, the number of main chain branch points constituted by the portion derived from the vinyl-based monomer containing an alkoxysilyl group or a halosilyl group is 4 or more, and a branch structure derived from a star polymer structure formed by a modifier in a reaction step comprises preferably 3 or more branches, more preferably 4 or more branches, and further preferably 8 or more branches.

Although the branch number Bn is increased both by modification with a coupling agent for obtaining a star structure and by introduction of a branching agent into the polymer, contribution to the branch number Bn is larger when a whole polymer chain is branched by using a coupling agent.

In design of a polymer, the branch number Bn can be controlled in accordance with selection of a coupling agent, and selection of a type of and setting of an amount of a branching agent, and the branch number Bn can be more easily controlled by taking a contribution rate into consideration.

<Main Chain Branch Structure>

The main chain branch structure corresponds to branch points in the portion derived from the vinyl-based monomer containing an alkoxysilyl group or a halosilyl group, and comprises 2 or more branch points, preferably 3 or more branch points, and further preferably 4 or more branch points.

The branch point forming the main branch structure has preferably at least 2 or more polymer chains, more preferably 3 or more polymer chains not corresponding to a main chain, and further preferably 4 or more polymer chains not corresponding to a main chain.

Particularly in a main chain branch structure containing a vinyl-based monomer containing an alkoxysilyl group or a halosilyl group, a peak derived from the main chain branch structure is detected, in signal detection by $^{29}$Si-NMR, in a range of −45 ppm to −65 ppm, and more restrictively in a range of −50 ppm to −60 ppm.

<Star Polymer Structure>

The conjugated diene-based polymer of the present embodiment preferably has a star polymer structure, and the number of branches derived from the star polymer structure is preferably 3 or more, more preferably 4 or more, further preferably 6 or more, and still further preferably 8 or more.

In a method for obtaining, as the conjugated diene-based polymer of the present embodiment, a conjugated diene-based polymer having a star polymer structure comprising 3 or more branches in which at least one branched chain of the star structure comprises a portion derived from a vinyl-based monomer containing an alkoxysilyl group or a halosilyl group, and the portion derived from the vinyl-based monomer containing the alkoxysilyl group or the halosilyl group further comprises a main chain branch structure, the "star polymer structure" can be formed by adjusting the number of functional groups of a modifier and an amount of the modifier to be added, and the "main chain branch structure" can be controlled by adjusting the number of functional groups of a branching agent, an amount of the branching agent to be added, and timing of adding the branching agent.

In order to obtain a conjugated diene-based polymer having a star polymer structure having 3 or more branches in which at least one branched chain of the star structure comprises a portion derived from a vinyl-based monomer containing an alkoxysilyl group or a halosilyl group, and the portion derived from the vinyl-based monomer containing the alkoxysilyl group or the halosilyl group further comprises a main chain branch structure, for example, a method in which polymerization is performed by using an organic lithium-based compound as a polymerization initiator, a branching agent for imparting a specific branch point is added during or after the polymerization, and modification is performed by using a modifier for imparting a specific branching ratio after continuation of the polymerization can be employed.

Control means for such polymerization conditions will be described later as a production method in the examples.

(Detailed Structure of Main Chain Branch Structure)

The conjugated diene-based polymer of the present embodiment is preferably a conjugated diene-based polymer in which the portion derived from the vinyl-based monomer containing an alkoxysilyl group or a halosilyl group is a monomer unit based on a compound represented by the following formula (1) or (2), comprises a branch point of a polymer chain containing the monomer unit based on the compound represented by formula (1) or (2), and has at least one end of the conjugated diene-based polymer of the present invention coupled by using a coupling agent, and the at least one end of the conjugated diene-based polymer is more preferably modified with a nitrogen atom-containing group.

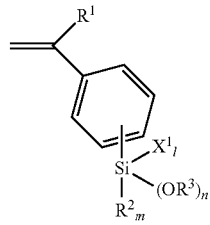

(1)

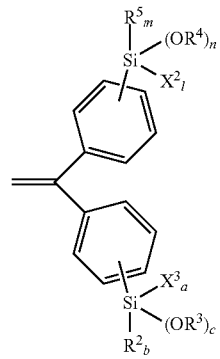

(2)

In formula (1), $R^1$ represents a hydrogen atom, an alkyl group having 1 to 20 carbon atoms, or an aryl group having 6 to 20 carbon atoms, and may have a branch structure in a part thereof.

$R^2$ and $R^3$ each independently represent an alkyl group having 1 to 20 carbon atoms, or an aryl group having 6 to 20 carbon atoms, and may have a branch structure in a part thereof. Each of $R^1$ to $R^3$, if present in a plural number, is respectively independent.

$X^1$ represents an independent halogen atom.

m represents an integer of 0 to 2, n represents an integer of 0 to 3, 1 represents an integer of 0 to 3, and (m+n+1) is 3.

In formula (2), $R^2$ to $R^5$ each independently represent an alkyl group having 1 to 20 carbon atoms, or an aryl group having 6 to 20 carbon atoms, and may have a branch structure in a part thereof.

Each of $R^2$ to $R^5$, if present in a plural number, is respectively independent.

$X^2$ and $X^3$ represent an independent halogen atom.

m represents an integer of 0 to 2, n represents an integer of 0 to 3, 1 represents an integer of 0 to 3, and (m+n+1) is 3.

a represents an integer of 0 to 2, b represents an integer of 0 to 3, c represents an integer of 0 to 3, and (a+b+c) is an integer of 3.

The conjugated diene-based polymer of the present embodiment preferably has a monomer unit based on a compound represented by formula (1) in which $R^1$ is a hydrogen atom and m is 0.

Thus, the number of branches is improved, and an effect of improving abrasion resistance and processability can be obtained.

Alternatively, the conjugated diene-based polymer of the present invention is preferably a conjugated diene-based polymer having a monomer unit based on a compound represented by formula (2) in which m is 0 and b is 0.

Thus, the effect of improving abrasion resistance and processability can be obtained.

Further alternatively, the conjugated diene-based polymer of the present embodiment preferably has a monomer unit based on a compound represented by formula (1) in which $R^1$ is a hydrogen atom, m is 0 and 1 is 0.

Thus, the branch number is improved, and the effect of improving abrasion resistance and processability is obtained.

Alternatively, the conjugated diene-based polymer of the present embodiment is preferably a conjugated diene-based polymer having a monomer unit based on a compound represented by formula (2) in which m is 0, 1 is 0, a is 0, and b is 0.

Thus, the effect of improving abrasion resistance and processability can be obtained.

The conjugated diene-based polymer of the present embodiment is more preferably a conjugated diene-based polymer having a monomer unit based on a compound represented by formula (1) in which $R^1$ is a hydrogen atom, 1 is 0, and n is 3.

Thus, the modification ratio and the branch number are improved, and an effect of improving low fuel consumption performance, abrasion resistance, and processability can be obtained.

[Branching Agent]

In the conjugated diene-based polymer of the present embodiment, in constructing a main chain branch structure, a branching agent represented by the following formula (1) or (2) is preferably used as the branching agent.

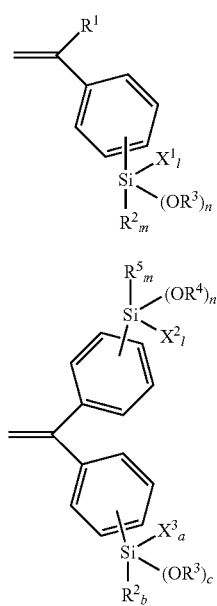

In formula (1), $R^1$ represents a hydrogen atom, an alkyl group having 1 to 20 carbon atoms, or an aryl group having 6 to 20 carbon atoms, and may have a branch structure in a part thereof.

$R^2$ and $R^3$ each independently represent an alkyl group having 1 to 20 carbon atoms, or an aryl group having 6 to 20 carbon atoms, and may have a branch structure in a part thereof.

Each of $R^1$ to $R^3$, if present in a plural number, is respectively independent.

$X^1$ represents an independent halogen atom.

m represents an integer of 0 to 2, n represents an integer of 0 to 3, 1 represents an integer of 0 to 3, and (m+n+1) is 3.

In formula (2), $R^2$ to $R^5$ each independently represent an alkyl group having 1 to 20 carbon atoms or an aryl group having 6 to 20 carbon atoms, and may have a branch structure in a part thereof.

Each of $R^2$ to $R^5$, if present in a plural number, is respectively independent.

$X^2$ and $X^3$ represent an independent halogen atom.

m represents an integer of 0 to 2, n represents an integer of 0 to 3, 1 represents an integer of 0 to 3, and (m+n+1) is 3.

a represents an integer of 0 to 2, b represents an integer of 0 to 3, c represents an integer of 0 to 3, and (a+b+c) is 3.

In the present embodiment, from the viewpoints of continuity of polymerization and improvement of the branch number, the branching agent used in constructing the main chain branch structure of the conjugated diene-based polymer is preferably a compound represented by formula (1) in which $R^1$ is a hydrogen atom and m is 0.

Alternatively, in the present embodiment, from the viewpoint of improvement of the branch number, the branching agent used in constructing the main chain branch structure of the conjugated diene-based polymer is preferably a compound represented by formula (2) in which m is 0 and b is 0.

In the present embodiment, from the viewpoints of continuity of polymerization and improvement of the modification ratio and the branch number, the branching agent used in constructing the main chain branch structure of the conjugated diene-based polymer is more preferably a compound represented by formula (1) in which $R^1$ is a hydrogen atom, m is 0, and 1 is 0.

In the present embodiment, from the viewpoint of improvement of the modification ratio and the branch number, the branching agent used in constructing the main chain branch structure of the conjugated diene-based polymer is further preferably a compound represented by formula (2) in which m is 0, 1 is 0, a is 0, and b is 0.

In the present embodiment, from the viewpoints of continuity of polymerization and improvement of the modification ratio and the branch number, the branching agent used in constructing a main chain branch structure of the conjugated diene-based polymer is more preferably a compound represented by formula (1) in which $R^1$ is a hydrogen atom, 1 is 0, and n is 3.

Examples of the branching agent represented by formula (1) include, but are not limited to, trimethoxy(4-vinylphenyl)silane, triethoxy(4-vinylphenyl)silane, tripropoxy(4-vinylphenyl)silane, tributoxy(4-vinylphenyl)silane, triisopropoxy(4-vinylphenyl)silane, trimethoxy(3-vinylphenyl)silane, triethoxy(3-vinylphenyl)silane, tripropoxy(3-vinylphenyl)silane, tributoxy(3-vinylphenyl)silane, triisopropoxy(3-vinylphenyl)silane, trimethoxy(2-vinylphenyl)silane, triethoxy(2-vinylphenyl)silane, tripropoxy(2-vinylphenyl)silane, tributoxy(2-vinylphenyl)silane, triisopropoxy(2-vinylphenyl)silane, dimethoxymethyl(4-vinylphenyl)silane, diethoxymethyl(4-vinylphenyl)silane, dipropoxymethyl(4-vinylphenyl)silane, dibutoxymethyl(4-vinylphenyl)silane, diisopropoxymethyl(4-vinylphenyl)silane, dimethoxymethyl(3-vinylphenyl)silane, diethoxymethyl(3-vinylphenyl)silane, dipropoxymethyl(3-vinylphenyl)silane, dibutoxymethyl(3-vinylphenyl)silane, diisopropoxymethyl(3-vinylphenyl)silane, dimethoxymethyl(2-vinylphenyl)silane, diethoxymethyl(2-vinylphenyl)silane, dipropoxymethyl(2-vinylphenyl)silane, dibutoxymethyl(2-vinylphenyl)silane, diisopropoxymethyl(2-vinylphenyl)silane, dimethylmethoxy(4-vinylphenyl)silane, dimethylethoxy(4-vinylphenyl)silane, dimethylpropoxy(4-vinylphenyl)silane, dimethylbutoxy(4-vinylphenyl)silane, dimethylisopropoxy(4-vinylphenyl)silane, dimethylmethoxy(3-vinylphenyl)silane, dimethylethoxy(3-vinylphenyl)silane, dimethylpropoxy(3-vinylphenyl)silane, dimethylbutoxy(3-vinylphenyl)silane, dimethylisopropoxy(3-vinylphenyl)silane, dimethylmethoxy(2-vinylphenyl)silane, dimethylethoxy(2-vinylphenyl)silane, dimethylpropoxy(2-vinylphenyl)silane, dimethylbutoxy(2-vinylphenyl)silane, dimethylisopropoxy(2-vinylphenyl)silane, trimethoxy(4-isopropenylphenyl)silane, triethoxy(4-isopropenylphenyl)silane, tripropoxy(4-isopropenylphenyl)silane, tributoxy(4-isopropenylphenyl)silane, triisopropoxy(4-isopropenylphenyl)silane, trimethoxy(3-isopropenylphenyl)silane, triethoxy(3-isopropenylphenyl)silane, tripropoxy(3-isopropenylphenyl)silane, tributoxy(3-isopropenylphenyl)silane, triisopropoxy(3-isopropenylphenyl)silane, trimethoxy(2-isopropenylphenyl)silane, triethoxy(2-isopropenylphenyl)silane, tripropoxy(2-isopropenylphenyl)silane, tributoxy(2-isopropenylphenyl)silane, triisopropoxy(2-isopropenylphenyl)silane, dimethoxymethyl(4-isopropenylphenyl)silane, diethoxymethyl(4-isopropenylphenyl)silane, dipropoxymethyl(4-isopropenylphenyl)silane, dibutoxymethyl(4-isopropenylphenyl)silane, diisopropoxymethyl(4-isopropenylphenyl)silane, dimethoxymethyl(3-isopropenylphenyl)silane, diethoxymethyl(3-isopropenylphenyl)silane, dipropoxymethyl(3-isopropenylphenyl)silane, dibutoxymethyl(3-isopropenylphenyl)silane, diisopropoxymethyl(3-isopropenylphenyl)silane, dimethoxymethyl(2-isopropenylphenyl)silane, diethoxymethyl(2-isopropenylphenyl)silane, dipropoxymethyl(2-isopropenylphenyl)silane, dibutoxymethyl(2-isopropenylphenyl)silane, diisopropoxymethyl(2-isopropenylphenyl)silane, dimethylmethoxy(4-isopropenylphenyl)silane, dimethylethoxy(4-isopropenylphenyl)silane, dimethylpropoxy(4-isopropenylphenyl)silane, dimethylbutoxy(4-isopropenylphenyl)silane, dimethylisopropoxy(4-isopropenylphenyl)silane, dimethylmethoxy(3-isopropenylphenyl)silane, dimethylethoxy(3-isopropenylphenyl)silane, dimethylpropoxy(3-isopropenylphenyl)silane, dimethylbutoxy(3-isopropenylphenyl)silane, dimethylisopropoxy(3-isopropenylphenyl)silane, dimethylmethoxy(2-isopropenylphenyl)silane, dimethylethoxy(2-isopropenylphenyl)silane, dimethylpropoxy(2-isopropenylphenyl)silane, dimethylbutoxy(2-isopropenylphenyl)silane, dimethylisopropoxy(2-isopropenylphenyl)silane, trichloro(4-vinylphenyl)silane, trichloro(3-vinylphenyl)silane, trichloro(2-vinylphenyl)silane, tribromo(4-vinylphenyl)silane, tribromo(3-vinylphenyl)silane, tribromo(2-vinylphenyl)silane, dichloromethyl(4-vinylphenyl)silane, dichloromethyl(3-vinylphenyl)silane, dichloromethyl(2-vinylphenyl)silane, dibromomethyl(4-vinylphenyl)silane, dibromomethyl(3-vinylphenyl)silane, dibromomethyl(2-vinylphenyl)silane, dimethylchloro(4-vinylphenyl)silane, dimethylchloro(3-vinylphenyl)silane, dimethylchloro(2-vinylphenyl)silane, dimethylbromo(4-vinylphenyl)silane, dimethylbromo(3-vinylphenyl)silane, and dimethylbromo(2-vinylphenyl)silane.

Among these, trimethoxy(4-vinylphenyl)silane, triethoxy(4-vinylphenyl)silane, tripropoxy(4-vinylphenyl)silane, tributoxy(4-vinylphenyl)silane, triisopropoxy(4-vinylphenyl)silane, trimethoxy(3-vinylphenyl)silane, triethoxy(3-vinylphenyl)silane, tripropoxy(3-vinylphenyl)silane, tributoxy(3-vinylphenyl)silane, triisopropoxy(3-vinylphenyl)silane, and trichloro(4-vinylphenyl)silane are preferred, and trimethoxy(4-vinylphenyl)silane, triethoxy(4-vinylphenyl)silane, tripropoxy(4-vinylphenyl)silane, tributoxy(4-vinylphenyl)silane, and triisopropoxy(4-vinylphenyl)silane are more preferred.

Examples of the branching agent represented by formula (2) include, but are not limited to, 1,1-bis(4-trimethoxysilylphenyl)ethylene, 1,1-bis(4-triethoxysilylphenyl)ethylene, 1,1-bis(4-tripropoxysilylphenyl)ethylene, 1,1-bis(4-tripentoxysilylphenyl)ethylene, 1,1-bis(4-triisopropoxysilylphenyl)ethylene, 1,1-bis(3-trimethoxysilylphenyl)ethylene, 1,1-bis(3-triethoxysilylphenyl)ethylene, 1,1-bis(3-tripropoxysilylphenyl)ethylene, 1,1-bis(3-tripentoxysilylphenyl)ethylene, 1,1-bis(3-triisopropoxysilylphenyl)ethylene, 1,1-bis(2-trimethoxysilylphenyl)ethylene, 1,1-bis(2-triethoxysilylphenyl)ethylene, 1,1-bis(3-tripropoxysilylphenyl)ethylene, 1,1-bis(2-tripentoxysilylphenyl)ethylene, 1,1-bis(2-triisopropoxysilylphenyl)ethylene, 1,1-bis(4-(dimethylmethoxysilyl)phenyl)ethylene, 1,1-bis(4-(diethylmethoxysilyl)phenyl)ethylene, 1,1-bis(4-(dipropylmethoxysilyl)phenyl)ethylene, 1,1-bis(4-(dimethylethoxysilyl)phenyl)ethylene, 1,1-bis(4-(diethylethoxysilyl)phenyl)ethylene, and 1,1-bis(4-(dipropylethoxysilyl)phenyl)ethylene.

Among these, 1,1-bis(4-trimethoxysilylphenyl)ethylene, 1,1-bis(4-triethoxysilylphenyl)ethylene, 1,1-bis(4-tripropoxysilylphenyl)ethylene, 1,1-bis(4-tripentoxysilylphenyl)ethylene, and 1,1-bis(4-triisopropoxysilylphenyl)ethylene are preferred, and 1,1-bis(4-trimethoxysilylphenyl)ethylene is more preferred.

[Production Method for Conjugated Diene-Based Polymer]

A production method for a conjugated diene-based polymer of the present embodiment comprises a polymerizing/branching step of polymerizing at least a conjugated diene compound in the presence of an organic lithium-based compound to obtain a conjugated diene-based polymer having a main chain branch structure by using at least any one of the various branching agents described above; and a step of coupling the conjugated diene-based polymer by using a coupling agent and/or a step of modifying the conjugated diene-based polymer with a modifier having a nitrogen atom-containing group.

The conjugated diene-based polymer contained in a modified conjugated diene-based polymer may be any one of a homopolymer of a single conjugated diene compound, a polymer, namely, a copolymer, of different kinds of conjugated diene compounds, and a copolymer of a conjugated diene compound and an aromatic vinyl compound.

(Polymerizing/Branching Step)

In the polymerizing/branching step in the production method for the conjugated diene-based polymer of the present embodiment, an organic lithium-based compound, such as an organomonolithium compound, is used as a polymerization initiator to polymerize at least a conjugated diene compound, and a branching agent is added thereto to obtain a conjugated diene-based polymer having a main chain branch structure.

In the polymerizing step, the polymerization is performed preferably by a growth reaction by a living anionic polymerization reaction, and thus, a conjugated diene-based polymer having an active end can be obtained. Thereafter, also in the branching step using a branching agent, main chain branching can be appropriately controlled, and there is a tendency that a modified conjugated diene-based polymer having a high modification ratio can be obtained by continuing the polymerization on the active end after the main chain branching.

<Polymerization Initiator>

As a polymerization initiator, an organic lithium-based compound is used, and at least an organomonolithium compound is preferably used.

An example of the organomonolithium compound includes, but is not limited to, an organomonolithium compound of a low molecular weight compound or a soluble oligomer.

Examples of the organomonolithium compound include, with respect to a bonding mode between an organic group and lithium thereof, a compound having a carbon-lithium bond, a compound having a nitrogen-lithium bond, and a compound having a tin-lithium bond.

An amount of the organomonolithium compound to be used as the polymerization initiator is preferably determined on the basis of the molecular weight of a target conjugated diene-based polymer.

A ratio of the amount of a monomer such as a conjugated diene compound to be used to the amount of the polymerization initiator to be used relates to the degree of polymerization of the target conjugated diene-based polymer. In other words, there is a tendency that it relates to the number average molecular weight and/or the weight average molecular weight.

Accordingly, in order to increase the molecular weight of the conjugated diene-based polymer, adjustment may be made to reduce the amount of the polymerization initiator, and in order to reduce the molecular weight, the adjustment may be made to increase the amount of the polymerization initiator.

From the viewpoint that it is used as one method for introducing a nitrogen atom into a conjugated diene-based polymer, the organomonolithium compound is preferably an alkyl lithium compound having a substituted amino group or dialkylamino lithium.

In this case, a conjugated diene-based polymer having, at a polymerization starting end, a nitrogen atom of an amino group is obtained.

The substituted amino group refers to an amino group having no active hydrogen or having a structure in which active hydrogen is protected.

Examples of an alkyl lithium compound containing an amino group having no active hydrogen include, but are not limited to, 3-dimethylaminopropyl lithium, 3-diethylaminopropyl lithium, 4-(methylpropylamino)butyl lithium and 4-hexamethyleneiminobutyl lithium.

Examples of an alkyl lithium compound containing an amino group having a structure in which active hydrogen is protected include, but are not limited to, 3-bistrimethylsilylaminopropyl lithium and 4-trimethylsilylmethylaminobutyl lithium.

Examples of the dialkylamino lithium include, but are not limited to, lithium dimethylamide, lithium diethylamide, lithium dipropylamide, lithium dibutylamide, lithium di-n-hexylamide, lithium diheptylamide, lithium diisopropylamide, lithium dioctylamide, lithium-di-2-ethylhexylamide, lithium didecylamide, lithium ethylpropylamide, lithium ethylbutylamide, lithium ethylbenzylamide, lithium methylphenetylamide, lithium hexamethyleneimide, lithium pyrrolidide, lithium piperidide, lithium heptamethyleneimide, lithium morpholide, 1-lithioazacyclooctane, 6-lithio-1,3,3-trimethyl-6-azabicyclo[3.2.1] octane, and 1-lithio-1,2,3,6-tetrahydropyridine.

Such an organomonolithium compound having a substituted amino group can be reacted with a small amount of a polymerizable monomer, such as 1,3-butadiene, isoprene or styrene, to be used as an organomonolithium compound of an oligomer soluble in normal hexane or cyclohexane.

From the viewpoint of the industrial availability and the controllability of the polymerization reaction, the organomonolithium compound is preferably an alkyl lithium compound. In this case, a conjugated diene-based polymer having an alkyl group at a polymerization starting end can be obtained.

Examples of the alkyl lithium compound include, but are not limited to, n-butyllithium, sec-butyllithium, tert-butyllithium, n-hexyllithium, benzyllithium, phenyllithium, and stilbene lithium.

From the viewpoint of the industrial availability and the controllability of the polymerization reaction, the alkyl lithium compound is preferably n-butyllithium or sec-butyllithium.

One of these organomonolithium compounds may be singly used, or two or more of these may be used together. Alternatively, another organic metal compound may be used together.

Examples of such another organic metal compound include alkaline earth metal compounds, other alkaline metal compounds, and other organic metal compounds.

Examples of the alkaline earth metal compounds include, but are not limited to, organic magnesium compounds, organic calcium compounds and organic strontium compounds. Other examples include compounds of alkoxides, sulfonates, carbonates and amides of alkaline earth metals.

Examples of the organic magnesium compounds include dibutyl magnesium and ethyl butyl magnesium. Examples of the other organic metal compounds include organic aluminum compounds.

Examples of a polymerization reaction mode employed in the polymerizing step include, but are not limited to, batch and continuous polymerization reaction modes.

In the continuous mode, one reactor or two or more connected reactors can be used. As a reactor for the continuous mode, for example, a tank or tubular reactor equipped with a stirrer can be used. In the continuous mode, a monomer, an inert solvent and a polymerization initiator are continuously fed to the reactor, a polymer solution containing a polymer is obtained in the reactor, and the polymer solution is continuously discharged.

As a reactor for the batch mode, for example, a tank reactor equipped with a stirrer is used. It is preferable, in the batch mode, that a monomer, an inert solvent and a polymerization initiator are fed to the reactor, the monomer is continuously or intermittently additionally fed if necessary during the polymerization, a polymer solution containing a polymer is obtained in the reactor, and the polymer solution is discharged after completing the polymerization.

In the production method for the conjugated diene-based polymer of the present embodiment, in order to obtain a conjugated diene-based polymer having an active end at a high ratio, the continuous mode in which a polymer is continuously discharged to be supplied to a next reaction in a short period of time is preferably employed.

In the polymerizing step for a conjugated diene-based polymer, the polymerization is performed preferably in an inert solvent.

Examples of the inert solvent include hydrocarbon-based solvents such as saturated hydrocarbons and aromatic hydrocarbons. Specific examples of the hydrocarbon-based solvent include, but are not limited to, aliphatic hydrocarbons such as butane, pentane, hexane and heptane; alicyclic hydrocarbons such as cyclopentane, cyclohexane, methylcyclopentane and methylcyclohexane; aromatic hydrocarbons such as benzene, toluene and xylene; and a hydrocarbon containing a mixture of any of these.

Impurities of allenes and acetylenes are preferably treated with an organic metal compound before the solvent is supplied to the polymerization reaction because thus, a conjugated diene-based polymer having an active end in a high concentration tends to be obtained, and a modified conjugated diene-based polymer having a high modification ratio tends to be obtained.

In the polymerizing step, a polar compound may be added. Thus, an aromatic vinyl compound can be randomly copolymerized with a conjugated diene compound, and there is a tendency that the polar compound can be used also as a vinylation agent for controlling a microstructure of a conjugated diene portion. Besides, it tends to be advantageous for, for example, acceleration of the polymerization reaction.

Examples of the polar compound include, but are not limited to, ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene, and 2,2-bis(2-oxolanyl)propane; tertiary amine compounds such as tetramethylethylenediamine, dipiperidinoethane, trimethylamine, triethylamine, pyridine, and quinuclidine; alkaline metal alkoxide compounds such as potassium-tert-amylate, potassium-tert-butylate, sodium-tert-butylate, and sodium amylate; and phosphine compounds such as triphenylphosphine.

One of these polar compounds may be singly used, or two or more of these may be used together.

The amount of the polar compound to be used is not especially limited but can be selected in accordance with the purpose or the like, and is preferably 0.01 mol or more and 100 mol or less per mole of the polymerization initiator.

Such a polar compound (a vinylation agent) can be used, as a microstructure modifier for a conjugated diene portion of the conjugated diene-based polymer, in an appropriate amount in accordance with a desired amount of bound vinyl.

There is a tendency that many polar compounds simultaneously have an effective randomizing effect in copolymerization of a conjugated diene compound and an aromatic vinyl compound, and can be used as a modifier for the distribution of the aromatic vinyl compound and the amount of a styrene block.

As a method for randomizing the conjugated diene compound and the aromatic vinyl compound, for example, a method as described in Japanese Patent Laid-Open No. 59-140211 in which a copolymerization reaction is started with the whole amount of styrene and a part of 1,3-butadiene with the rest of 1,3-butadiene intermittently added during the copolymerization reaction may be employed.

In the polymerizing step, a polymerization temperature is preferably a temperature at which the living anionic polymerization proceeds, and from the viewpoint of productivity, is more preferably 0° C. or more, and more preferably 120° C. or less. If the polymerization temperature falls in this range, there is a tendency that a reaction amount of the modifier reacted to the active end can be sufficiently attained after completing the polymerization. The polymerization temperature is further preferably 50° C. or more and 100° C. or less.

In the production method for the conjugated diene-based polymer of the present embodiment, the amount of the branching agent to be added in the branching step for forming a main chain branch structure is not especially limited but can be selected in accordance with the purpose or the like, and is preferably 0.03 mol or more and 0.5 mol or less, more preferably 0.05 mol or more and 0.4 mol or less, and further preferably 0.01 mol or more and 0.25 mol or less per mole of the polymerization initiator.

The branching agent can be used in an appropriate amount in accordance with the number of branch points of a main chain branch structure of the conjugated diene portion of the target conjugated diene-based polymer.

The timing of adding the branching agent in the branching step is not especially limited but can be selected in accordance with the purpose or the like, and from the viewpoints of the improvement of the absolute molecular weight of the conjugated diene-based polymer and the improvement of the modification ratio, is timing, after adding the polymerization initiator, when a raw material conversion rate is preferably 20% or more, more preferably 40% or more, further preferably 50% or more, still further preferably 65% or more, and much further preferably 75% or more.

After the addition of the branching agent, a desired raw material may be additionally added to continue the polymerizing step after the branching, or the above-described process may be repeated.

An amount of a monomer to be additionally added is not especially limited, and from the viewpoint of the improvement of the modification ratio of the conjugated diene-based polymer, is preferably 5% or more, more preferably 10% or more, further preferably 15% or more, still further preferably 20% or more, and much further preferably 25% or more based on the total amount of conjugated diene-based monomers, for example, the total amount of butadiene, used in the polymerizing step.

The conjugated diene-based polymer obtained, prior to the modification reaction step, by the polymerizing/branching step in the production method for the conjugated diene-based polymer of the present embodiment has a Mooney viscosity, measured at 110° C., of preferably 10 or more and 150 or less, more preferably 15 or more and 140 or less, and further preferably 20 or more and 130 or less.

If the Mooney viscosity falls in this range, the conjugated diene-based polymer of the present embodiment tends to be excellent in processability and abrasion resistance.

The conjugated diene-based polymer of the present embodiment may be a polymer of a conjugated diene monomer and a branching agent, or may be a copolymer of a conjugated diene monomer, a branching agent, and another monomer.

For example, when the conjugated diene monomer is butadiene or isoprene, and this diene monomer is polymerized with a branching agent containing an aromatic vinyl portion, a polymer chain is what is called polybutadiene or polyisoprene, and a polymer containing a structure derived from an aromatic vinyl in a branched portion is obtained. Owing to such a structure, linearity of each polymer chain can be improved and a crosslink density obtained after vulcanization can be improved, resulting in obtaining an effect of improving the abrasion resistance of the polymer. Therefore, such a polymer is suitably used for a tire, resin modification, interior/exterior of a vehicle, an anti-vibration rubber, shoes and the like.

When the conjugated diene-based polymer is used in application to a tire tread, a copolymer of a conjugated diene monomer, an aromatic vinyl monomer, and a branching agent is suitably used, and in the copolymer used in this application, the amount of bound conjugated diene is preferably 40% by mass or more and 100% by mass or less, and more preferably 55% by mass or more and 80% by mass or less.

Besides, the amount of bound aromatic vinyl in the conjugated diene-based polymer of the present embodiment is not especially limited, and is preferably 0% by mass or more and 60% by mass or less, and more preferably 20% by mass or more and 45% by mass or less.

When the amounts of the bound conjugated diene and the bound aromatic vinyl fall in the above-described ranges, the balance between a low hysteresis loss property and wet skid resistance, abrasion resistance and fracture performance obtained when in the form of a vulcanizate tend to be more excellent.

Here, the amount of bound aromatic vinyl can be measured in accordance with UV absorption by a phenyl group, and based on the thus obtained amount, the amount of bound conjugated diene can be also obtained. Specifically, these amounts are measured in accordance with a method described later in the examples.

In the conjugated diene-based polymer of the present embodiment, the amount of bound vinyl in a conjugated diene bond unit is not especially limited, and is preferably 10% by mol or more and 75% by mol or less, and more preferably 20% by mol or more and 65% by mol or less.

If the amount of bound vinyl falls in the above-described range, the balance between a low hysteresis loss property and wet skid resistance, abrasion resistance, and fracture strength obtained when in the form of a vulcanizate tend to be more excellent.

Here, if the modified diene-based polymer is a copolymer of butadiene and styrene, the amount of bound vinyl (the amount of a 1,2-bond) in a butadiene bond unit can be obtained by Hampton method (R. R. Hampton, Analytical Chemistry, 21, 923 (1949)). Specifically, it can be measured by a method described in the examples below.

As for the microstructure of the conjugated diene-based polymer, if the amounts of the aforementioned bonds in the conjugated diene-based polymer of the present embodiment respectively fall in the above-described ranges and the glass transition temperature of the conjugated diene-based polymer is −70° C. or more and −15° C. or less, there is a tendency that a vulcanizate more excellent in the balance between a low hysteresis loss property and wet skid resistance can be obtained.

The glass transition temperature is defined as a peak top (an inflection point) of a DSC differential curve obtained by recording a DSC curve during temperature increase in a prescribed temperature range in accordance with ISO 22768: 2006. Specifically, it can be measured in accordance with a method described in the examples below.

If the conjugated diene-based polymer of the present embodiment is a conjugated diene-aromatic vinyl copolymer, it preferably contains a few or no blocks in which 30 or more aromatic vinyl units are chained. More specifically, if the conjugated diene-based polymer of the present embodiment is a butadiene-styrene copolymer, in employing a known method in which the copolymer is decomposed by Kolthoff method (a method described by I. M. Kolthoff, et al., J. Polym. Sci. 1, 429 (1946)) to analyze the amount of polystyrene insoluble in methanol, blocks in each of which 30 or more aromatic vinyl units are chained are preferably 5.0% by mass or less, and more preferably 3.0% by mass or less based on the total amount of the conjugated diene-based polymer.

From the viewpoint of improving fuel efficiency, if the conjugated diene-based polymer of the present embodiment is a conjugated diene-aromatic vinyl copolymer, a larger proportion of an aromatic vinyl unit is preferably present singly.

Specifically, if the conjugated diene-based polymer of the present embodiment is a butadiene-styrene copolymer, when the conjugated diene-based polymer is decomposed by employing a method through ozonolysis known as a method of Tanaka et al., (Polymer, 22, 1721 (1981)) to analyze a styrene chain distribution by GPC, it is preferable that the amount of isolated styrene, based on the whole amount of bound styrene, is 40% by mass or more, and that the amount of a chain styrene structure consisting of 8 or more chained styrene is 5.0% by mass or less.

In this case, a resultant vulcanized rubber tends to attain excellent performance of particularly low hysteresis loss.

(Reaction Step)

In the production method for the conjugated diene-based polymer of the present embodiment, a step of coupling an active end of the conjugated diene-based polymer obtained through the polymerizing/branching step with a coupling agent, such as a tri- or higher functional reactive compound and/or a step of modifying it with a modifier containing a nitrogen atom-containing group (preferably a coupling agent containing a nitrogen atom-containing group) are performed.

Hereinafter, the step of coupling and/or the step of modifying the active end will be referred to as a reaction step.

In the reaction step, one end of the active end of the conjugated diene-based polymer is subjected to a modification reaction with a coupling agent or a nitrogen atom-containing group, and thus, a modified conjugated diene-based polymer is obtained.

<Coupling Agent>

The coupling agent used in the reaction step of the production method for the conjugated diene-based polymer of the present embodiment may have any structure as long as it is a tri- or higher functional reactive compound, and is preferably a tri- or higher functional reactive compound having a silicon atom, and more preferably one having at least 4 silicon-containing functional groups. A more preferable coupling agent is a compound in which at least one silicon atom constitutes an alkoxysilyl group or silanol group having 1 to 20 carbon atoms. Examples of such a coupling agent include tetramethoxysilane and tetraethoxysilane.

<Modifier>

Examples of the modifier include, but are not limited to, tris(3-trimethoxysilylpropyl)amine, tris(3-triethoxysilylpropyl)amine, tris(3-tripropoxysilylpropyl)amine, bis(3-trimethoxysilylpropyl)-[3-(2,2-dimethoxy-1-aza-2-silacyclopentane)propyl]amine, tetrakis(3-trimethoxysilylpropyl)-1,3-propanediamine, tris(3-trimethoxysilylpropyl)-[3-(1-methoxy-2-trimethylsilyl-1-sila-2-azacyclopentane)propyl]-1,3-propanediamine, tris(3-trimethoxysilylpropyl)-[3-(1-methoxy-2-methyl-1-sila-2-azacyclopentane)propyl]-1,3-propanediamine, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-propanediamine, tetrakis(3-trimethoxysilylpropyl)-1,3-bisaminomethylcyclohexane, tris(3-trimethoxysilylpropyl)-[3-(2,2-dimethoxy-1-aza-2-silacyclopentane)propyl]-1,3-bisaminomethylcyclohexane, tetrakis(3-trimethoxysilylpropyl)-1,6-hexamethylenediamine, pentakis(3-trimethoxysilylpropyl)-diethylenetriamine, tris (3-trimethoxysilylpropyl)-methyl-1,3-propanediamine, tetrakis[3-(2,2-dimethoxy-1-aza-2-silacyclopentane)propyl]silane, bis(3-trimethoxysilylpropyl)-bis[3-(2,2-dimethoxy-1- aza-2-silacyclopentane)propyl]silane, tris[3-(2,2-dimethoxy-1-aza-2-silacyclopentane)propyl]-(3-trimethoxysilylpropyl)silane, tris[3-(2,2-dimethoxy-2-silacyclopentane)propyl]-[3-(1-methoxy-1-trimethylsilyl-1-sila-2-azacyclopentane)propyl]silane, 3-tris[2-(2,2-dimethoxy-1-aza-2-silacyclopentane)ethoxy]silyl-1-trimethoxysilylpropane, 1-[3-(1-methoxy-2-trimethylsilyl-1-sila-2-azacyclopentane)propyl]-3,4,5-tris(3-trimethoxysilylpropyl)-cyclohexane, 1-[3-(2,2-dimethoxy-1-aza-2-silacyclopentane)propyl]-3,4,5-tris(3-trimethoxysilylpropyl)-cyclohexane, 3,4,5-tris(3-trimethoxysilylpropyl)-cyclohexyl-[3-(2,2-dimethoxy-1-aza-2-silacyclopentane)propyl] ether, (3-trimethoxysilylpropyl) phosphate, bis(3-trimethoxysilyl-propyl)-[3-(2,2-dimethoxy-1-aza-2-silacyclopentane)pro-pyl] phosphate, bis[3-(2,2-dimethoxy-1-aza-2-silacyclopentane)propyl]-(3-trimethoxysilylpropyl) phosphate, and tris [3-(2,2-dimethoxy-1-aza-2-silacyclopentane)propyl] phosphate.

The modifier preferably contains a compound represented by any one of the following general formulas (A) to (C):

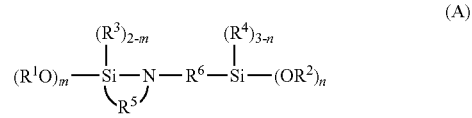

(A)

wherein $R^1$ to $R^4$ each independently represent an alkyl group having 1 to 20 carbon atoms or an aryl group having 6 to 20 carbon atoms, $R^5$ represents an alkylene group having 1 to 10 carbon atoms, $R^6$ represents an alkylene group having 1 to 20 carbon atoms, m represents an integer of 1 or 2, n represents an integer of 2 or 3, (m+n) is an integer of 4 or more, and each of $R^1$ to $R^4$, if present in a plural number, is respectively independent.

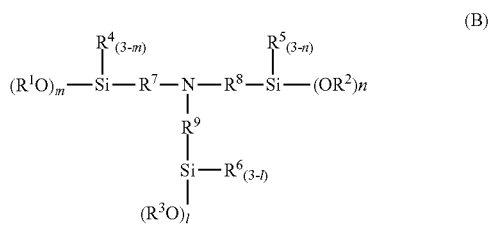

(B)

wherein $R^1$ to $R^6$ each independently represent an alkyl group having 1 to 20 carbon atoms or an aryl group having 6 to 20 carbon atoms, $R^7$ to $R^9$ each independently represent an alkylene group having 1 to 20 carbon atoms, m, n, and l each independently represent an integer of 1 to 3, (m+n+l) is an integer of 4 or more, and each of $R^1$ to $R^6$, if present in a plural number, is respectively independent.

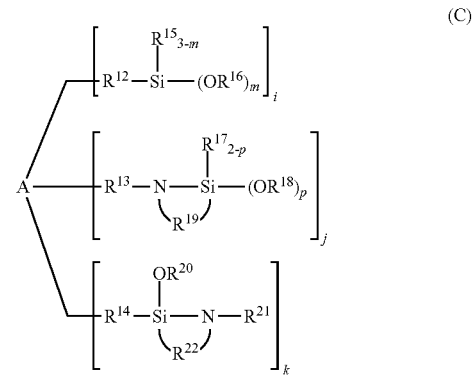

(C)

wherein $R^{12}$ to $R^{14}$ each independently represent a single bond or an alkylene group having 1 to 20 carbon atoms, $R^{15}$ to $R^{19}$ and $R^{20}$ each independently represent an alkyl group having 1 to 20 carbon atoms, $R^{19}$ and $R^{22}$ each independently represent an alkylene group having 1 to 20 carbon atoms, $R^{21}$ represents an alkyl group or a trialkyl silyl group having 1 to 20 carbon atoms, m represents an integer of 1 to 3, p represents 1 or 2, each of $R^{12}$ to $R^{22}$, m and p, if present in a plural number, is respectively independent, and may be the same or different, i represents an integer of 0 to 6, j represents an integer of 0 to 6, k represents an integer of 0 to 6, (i+j+k) is an integer of 4 to 10, and A represents a hydrocarbon group having 1 to 20 carbon atoms, or an organic group having at least one atom selected from the group consisting of an oxygen atom, a nitrogen atom, a silicon atom, a sulfur atom, and a phosphorus atom, and not having active hydrogen.

Examples of the modifier represented by formula (A) include, but are not limited to, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy-2-methyl-1-(3-trimethoxysilylpropyl)-1-aza-2-silacyclopentane, 2-ethoxy-2-ethyl-1-(3-triethoxysilylpropyl)-1-aza-2-silacyclopentane, 2-methoxy-1-methyl-1-(3-dimethoxymethylsilylpropyl)-1-aza-2-silacyclopentane, and 2-ethoxy-2-ethyl-1-(3-diethoxyethylsilylpropyl)-1-aza-2-silacyclopentane.

Among these, from the viewpoint of reactivity and interactivity between a functional group of the modifier and an inorganic filler such as silica, and from the viewpoint of processability, it is preferable that m is 2 and that n is 3. Specifically, 2,2-dimethoxy-1-(3-trimethoxysilylpropyl)-1-aza-2-silacyclopentane and 2,2-diethoxy-1-(3-triethoxysilylpropyl)-1-aza-2-silacyclopentane are preferred.

The reaction temperature, the reaction time and the like in causing the modifier represented by formula (A) to react with the polymer active end are not especially limited, and it is preferable to perform the reaction at 0° C. or more and 120° C. or less for 30 seconds or more.

A total mole number of an alkoxy group bonded to a silyl group of the compound used as the modifier represented by formula (A) is preferably 0.6 or more times and 3.0 or less times, more preferably 0.8 or more times and 2.5 or less times, and further preferably 0.8 or more times and 2.0 or less times of a mole number of an alkaline metal compound and/or an alkaline earth metal compound of a polymerization initiator to be added. From the viewpoint that the thus obtained modified conjugated diene-based polymer has sufficient modification ratio and molecular weight and has a branch structure, the total mole number is preferably 0.6 times or more, and a branched polymer component is preferably obtained by coupling polymer ends for improving processability, and in addition, from the viewpoint of cost of a modifier, the total mole number is preferably 3.0 times or less.

More specific mole number of the polymerization initiator is preferably 3.0-fold moles or more, and more preferably 4.0-fold moles or more relative to the mole number of the modifier.

Examples of the modifier represented by formula (B) include, but are not limited to, tris(3-trimethoxysilylpropyl)amine, tris(3-methyldimethoxysilylpropyl)amine, tris(3-triethoxysilylpropyl)amine, tris(3-methyldiethoxysilylpropyl)amine, tris(trimethoxysilylmethyl)amine, tris(2-trimethoxysilylethyl)amine, and tris(4-trimethoxysilylbutyl)amine.

Among these, from the viewpoint of reactivity and interactivity between a functional group of the modifier and an inorganic filler such as silica, and from the viewpoint of processability, it is preferable that n, m and l are all 3. Specific preferable examples include tris(3-trimethoxysilylpropyl)amine, and tris(3-triethoxysilylpropyl)amine.

The reaction temperature, the reaction time and the like in causing the modifier represented by formula (B) to react with the polymer active end are not especially limited, and it is preferable to perform the reaction at 0° C. or more and 120° C. or less for 30 seconds or more.

A total mole number of an alkoxy group bonded to a silyl group of the compound used as the modifier represented by formula (B) is preferably 0.6 or more times and 3.0 or less times, more preferably 0.8 or more times and 2.5 or less times, and further preferably 0.8 or more times and 2.0 or less times of a mole number of lithium contained in a polymerization initiator to be added. From the viewpoint that the modified conjugated diene-based polymer has sufficient modification ratio and molecular weight and has a branch structure, the total mole number is preferably 0.6 times or more, and a branched polymer component is preferably obtained by coupling polymer ends for improving processability, and in addition, from the viewpoint of cost of a modifier, the total mole number is preferably 3.0 times or less.

More specific mole number of the polymerization initiator is preferably 4.0-fold moles or more, and more preferably 5.0-fold moles or more relative to the mole number of the modifier.

In formula (C), A is preferably represented by any one of the following general formulas (II) to (V):

(II)

wherein $B^1$ represents a single bond or a hydrocarbon group having 1 to 20 carbon atoms, a represents an integer of 1 to 10, and $B^1$, if present in a plural number, is respectively independent;

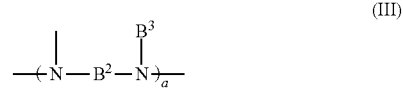
(III)

wherein $B^2$ represents a single bond or a hydrocarbon group having 1 to 20 carbon atoms, $B^3$ represents an alkyl group having 1 to 20 carbon atoms, a represents an integer of 1 to 10, and each of $B^2$ and $B^3$, if present in a plural number, is respectively independent;

(IV)

wherein $B^4$ represents a single bond or a hydrocarbon group having 1 to 20 carbon atoms, a represents an integer of 1 to 10, and $B^4$, if present in a plural number, is respectively independent; and

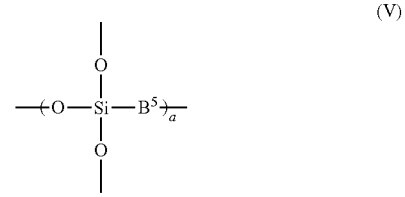
(V)

wherein $B^5$ represents a single bond or a hydrocarbon group having 1 to 20 carbon atoms, a represents an integer of 1 to 10, and $B^5$, if present in a plural number, is respectively independent.

Examples of the modifier represented by formula (C) wherein A is represented by formula (II) include, but are not limited to, tris(3-trimethoxysilylpropyl)amine, bis(3-trimethoxysilylpropyl)-[3-(2,2-dimethoxy-1-aza-2-silacyclopentane)propyl]amine, bis[3-(2,2-dimethoxy-1-aza-2-silacyclopentane)propyl]-(3-trimethoxysilylpropyl)amine, tris[3-(2,2-dimethoxy-1-aza-2-silacyclopentane)propyl]amine, tris(3-ethoxysilylpropyl)amine, bis(3-triethoxysilylpropyl)-[3-(2,2-diethoxy-1-aza-2-silacylopentane)propyl]amine, bis[3-(2,2-diethoxy-1-aza-2-silacyclopentane)propyl]-(3-triethoxysilylpropyl)amine, tris[3-(2,2-diethoxy-1-aza-2-silacyclopentane)propyl]amine, tetrakis(3-trimethoxysilylpropyl)-1,3-propanediamine, tris(3-trimethoxysilylpropyl)-[3-(2,2-dimethoxy-1-aza-2-silacyclopentane)propyl]-1,3-propanediamine, bis(3-trimethoxysilylpropyl)-bis[3-(2,2-dimethoxy-1-aza-2-silacyclopentane)propyl]-1,3-propanedimane, tris[3-(2,2-dimethoxy-1-aza-2-silacyclopentane)propyl]-(3-trimethoxysilylpropyl)1,3-propanediamine, tetrakis[3-(2,2-dimethoxy-1-aza-2-silacyclopentane)propyl]-1,3-propanediamine, tris(3-trimethoxysilylpropyl)-[3-(1-methoxy-2-trimethylsilyl-1-sila-azacyclopentane)propyl]-1,3-propanediamine, bis(3-trimethoxysilylpropyl)-[3-(2,2-dimethoxy-1-aza-2-silacyclopentane)propyl]-[3-(1-methoxy-2-trimethylsilyl-1-sila-2-azacyclopentane)propyl]-1,3-propanediamine, bis[3-(2,2-dimethoxy-1-aza-2-silacyclopentane)propyl]-(3-trimethoxysilylpropyl)-[3-(1-methoxy-2-trimethylsilyl-1-sila-2-azacyclopentane)propyl]-1,3-propanediamine, tris[3-(2,2-dimethoxy-1-aza-2- silacyclopentane)propyl]-[3-(1-methoxy-2-trimethylsilyl-1-sila-2-azacyclopentane)propyl]-1,3-propanediamine, tetrakis(3-triethoxysilylpropyl)-1,3-propanediamine, tris(3-triethoxysilylpropyl)-[3-(2,2-diethoxy-1-aza-2-silacyclopentane)propyl]-1,3-propanediamine, bis(3-triethoxysilylpropyl)-bis[3-(2,2-diethoxy-1-aza-2-silacyclopentane)propyl]-1,3-propanediamine, tris[3-(2,2-diethoxy-1-aza-2-silacyclopentane)propyl]-(3-triethoxysilylpropyl)-1,3-propanediamine, tetrakis[3-(2,2-diethoxy-1-aza-2-silacyclopentane)propyl]-1,3-propanediamine, tris(3-triethoxysilylpropyl)-[3-(1-ethoxy-2-trimethylsilyl-1-sila-2-azacyclopentane)propyl]-1,3-propanediamine, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-propanediamine, bis[3-(2,2-diethoxy-1-aza-2-silacyclopentane)propyl]-(3-triethoxysilylpropyl)-[3-(1-ethoxy-2-trimethylsilyl-1-sila-2-azacyclopentane)propyl]-1,3-propanediamine, tris[3-(2,2-diethoxy-1-aza-2-silacyclopentane)propyl]-[3-(1-ethoxy-2-trimethylsilyl-1-sila-2-azacyclopentane)propyl]-1,3-propanediamine, tetrakis(3-trimethoxysilylpropyl)-1,3-bisaminomethylcyclohexane, tris(3-trimethoxysilylpropyl)-[3-(2,2-dimethoxy-1-aza-2-silacyclopentane)propyl]-1,3-bisaminomethycyclohexane, bis(3-trimethoxysilylpropyl)-bis[3-(2,2-dimethoxy-1-aza-2-silacyclopentane)propyl]-1,3-bisaminomethylcyclohexane, tris[3-(2,2-dimethoxy-1-aza-2-silacyclopentane)propyl]-(3-trimethoxysilylpropyl)-1,3-bisaminomethylcyclohexane, tetrakis[3-(2,2-dimethoxy-1-aza-2-silacyclopentane)propyl]-1,3-propanediamine, tris(3-trimethoxysilylpropyl)-[3-(1-methoxy-2-trimethylsilyl-1-sila-2-azacyclopentane)propyl]-1,3-bisaminomethylcyclohexane, bis(3-trimethoxysilylpropyl)-[3-(2,2-dimethoxy-1-aza-2-silacyclopentane)propyl]-[3-(1-methoxy-2-trimethylsilyl-1-sila-2-azacyclopentane)propyl]-1,3-bisaminomethylcyclohexane, bis[3-(2,2-dimethoxy-1-aza-2-silacyclopentane)propyl]-(3-trimethoxysilylpropyl)-[3-(1-methoxy-2-trimethylsilyl-1-sila-2-azacyclopentane)propyl]-1,3-biasminomethylcyclohexane, tris[3-(2,2-dimethoxy-1-aza-2-cyclopentane)propyl]-[3-(1-methoxy-2-trimethylsilyl-1-sila-2-azacyclopentane)propyl]-1,3-bisaminomethylcyclohexane, tetrakis(3-triethoxysilylpropyl)-1,3-propanediamine, tris(3-triethoxysilylpropyl)-[3-(2,2-diethoxy-1-aza-2-silacyclopentane)propyl]-1,3-bisaminomethylcyclohexane, bis(3-trimethoxysilylpropyl)-bis[3-(2,2-diethoxy-1-aza-2-silacyclopentane)propyl]-1,3-bisaminomethylcyclohexane, tris[3-(2,2-diethoxy-1-aza-2-silacyclopentane)propyl]-(3-triethoxysilylpropyl)-1,3-propanediamine, tetrakis[3-(2,2-diethoxy-1-aza-2-silacyclopentane)propyl]-1,3-propanediamine, tris(3-triethoxysilylpropyl)-[3-(1-ethoxy-2-trimethylsilyl-1-sila-2-azacyclopentane)propyl]-1,3-bisaminomethylcyclohexane, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-bisaminomethylcyclohexane, bis[3-(2,2-diethoxy-1-aza-2-silacyclopentane)propyl]-(3-triethoxysilylpropyl)-[3-(1-ethoxy-2-trimethylsilyl-1-sila-2-azacyclopentane)propyl]-1,3-bisaminomethylcyclohexane, tris[3-(2,2-diethoxy-1-aza-2-silacyclopentane)propyl]-[3-(1-ethoxy-2-trimethylsilyl-1-sila-2-azacyclopentane)propyl]-1,3-bisaminomethylcyclohexane, tetrakis(3-trimethoxysilylpropyl)-1,6-hexamethylenediamine and pentakis(3-trimethoxysilylpropyl)-diethylenetriamine Examples of the modifier represented by formula (C) wherein A is represented by formula (III) include, but are not limited to, tris(3-trimethoxysilylpropyl)-methyl-1,3-propanediamine, bis(2-trimethoxysilylpropyl)-[3-(2,2-dimethoxy-1-aza-2-silacyclopentane)propyl]-methyl-1,3-propanediamine, bis[3-(2,2-dimethoxy-1-aza-2-silacyclopentane)propyl]-(3-trimethoxysilylpropyl)-methyl-1,3-propanediamine, tris(3-triethoxysilylpropyl)-methyl-1,3-propanediamine, bis(2-triethoxysilylpropyl)-[3-(2,2-diethoxy-1-aza-2-silacyclopentane)propyl]-methyl-1,3-propanediamine, bis[3-(2,2-diethoxy-1-aza-2-silacyclopentane)propyl]-(3-triethoxysilylpropyl)-methyl-1,3-propanediamine, $N^1,N^{1'}$-(propane-1,3-diyl)bis($N^1$-methyl-$N^3$,$N^3$-bis(3-(trimethoxysilyl)propyl)-1,3-propanediamine) and $N^1$-(3-(bis(3-(trimethoxysilyl)propyl)amino)propyl)-$N^1$-methyl-$N^3$-(3-(methyl-(3-(trimethoxysilyl)propyl)amino)propyl)-$N^3$-(3-(trimethoxysilyl)propyl)-1,3-propanediamine Examples of the modifier represented by formula (C) wherein A is represented by formula (IV) include, but are not limited to, tetrakis[3-(2,2-dimethoxy-1-aza-2-silacyclopentane)propyl]silane, tris[3-(2,2-dimethoxy-1-aza-2-silacyclopentane)propyl]-(3-trimethoxysilylpropyl)silane, tris[3-(2,2-dimethoxy-1-aza-2-silacyclopentane)propyl]-[3-(1-methoxy-2-trimethylsilyl-1-sila-2-azacyclopentane)propyl]silane, bis(3-trimethoxysilylpropyl)-bis[3-(2,2-dimethoxy-1-aza-2-silacyclopentane)propyl]silane, (3-trimethoxysilyl)-[3-(1-methoxy-2-trimethylsilyl-1-sila-2-azacyclopentane)-bis[3-(2,2-dimethoxy-1-aza-2-silacyclopentane)propyl]silane, bis[3-(1-methoxy-2-trimethylsilyl-1-sila-2-azacyclopentane)-bis[3-(2,2-dimethoxy-1-aza-2-silacyclopentane)propyl]silane, tris(3-trimethoxysilylpropyl)-[3-(2,2-dimethoxy-1-aza-2-silacyclopentane)propyl]silane, bis(3-trimethoxysilylpropyl)-[3-(1-methoxy-2-trimethylsilyl-1-sila-2-azacyclopentane)propyl]-[3-(2,2-dimethoxy-1-aza-2-silacyclopentane)propyl]silane, bis[3-(1-methoxy-2-trimethylsilyl-1-sila-2-azacyclopentane)propyl]-bis(3-trimethoxysilylpropyl)silane, and bis(3-trimethoxysilylpropyl)-bis[3-(1-methoxy-2-methyl-1-sila-2-azacyclopentane)propyl]silane.

Examples of the modifier represented by formula (C) wherein A is represented by formula (V) include, but are not limited to, 3-tris[2-(2,2-dimethoxy-1-aza-2-silacyclopentane)ethoxy]silyl-1-(2,2-dimethoxy-1-aza-2-silacyclopentane)propane, and 3-tris[2-(2,2-dimethoxy-1-aza-2-silacyclopentane)ethoxy]silyl-1-trimethoxysilylpropane.

In formula (C), A is preferably represented by formula (II) or formula (III), and k represents 0 (zero).

Such a modifier tends to be easily available, and tends to make the resultant conjugated diene-based polymer of the present embodiment more excellent in abrasion resistance and a low hysteresis loss property when in the form of a vulcanizate.

Examples of such a modifier include, but are not limited to, bis(3-trimethoxysilylpropyl)-[3-(2,2-dimethoxy-1-aza-2-silacyclopentane)propyl]amine, tris(3-trimethoxysilylpropyl)amine, tris(3-triethoxysilylpropyl)amine, tris(3-trimethoxysilylpropyl)-[3-(2,2-dimethoxy-1-aza-2-silacyclopentane)propyl]-1,3-propanediamine, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, tris(3-trimethoxysilylpropyl)-methyl-1,3-propanediamine, and bis[3-(2,2-dimethoxy-1-aza-2-silacyclopentane)propyl]-(3-trimethoxysilylpropyl)-methyl-1,3-propanediamine.

In formula (C), it is more preferable that A is represented by formula (II) or formula (III), and that k represents 0 (zero) and a represents an integer of 2 to 10 in formula (II) or formula (III).

Thus, abrasion resistance and a low hysteresis loss property when in the form of a vulcanizate tend to be more excellent.

Examples of such a modifier include, but are not limited to, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, and $N^1$-(3-(bis(3-(trimethoxysilyl)propyl)amino)propyl)-$N^1$-methyl-$N^3$-(3-(methyl(3-(trimethoxysilyl)propyl)amino)propyl)-$N^3$-(3-(trimethoxysilyl)propyl)-1,3-propanediamine.

The amount of the compound represented by formula (C) to be added as the modifier can be adjusted for causing the modifier to react with the conjugated diene-based polymer in such a manner that a mole number of the modifier relative to a mole number of the conjugated diene-based polymer can be in a desired stoichiometric ratio, and thus, a desired star polymer branch structure tends to be attained.

Specifically, the mole number of the conjugated diene-based polymer is preferably 5.0-fold moles or more, and more preferably 6.0-fold moles or more relative to the mole number of the modifier.

In this case, in formula (C), the number of functional groups $((m-1)\times i+p\times j+k)$ of the modifier is preferably an integer of 5 to 10, and more preferably an integer of 6 to 10.

In the modified conjugated diene-based polymer of the present embodiment, a ratio of a modifying group-containing polymer in the conjugated diene-based polymer is expressed as a modification ratio.

In the conjugated diene-based polymer of the present embodiment, the modification ratio is preferably 60% by mass or more, more preferably 65% by mass or more, further preferably 70% by mass or more, still further preferably 75% by mass or more, much further preferably 80% by mass or more, and particularly preferably 82% by mass or more.

If the modification ratio is 60% by mass or more, there is a tendency that processability obtained when used for obtaining a vulcanizate is excellent, and abrasion resistance and a low hysteresis loss property when in the form of a vulcanizate are more excellent.

In the present embodiment, a condensation reaction step of performing a condensation reaction in the presence of a condensation accelerator may be performed after the reaction step, or before the reaction step.

The conjugated diene-based polymer of the present embodiment may be hydrogenated in the conjugated diene portion thereof.

A method for hydrogenating the conjugated diene portion of the modified conjugated diene-based polymer of the present embodiment is not especially limited, and any of known methods can be employed.

As a suitable hydrogenation method, a method in which the hydrogenation is performed by blowing gaseous hydrogen into the polymer solution in the presence of a catalyst can be employed.

Examples of the catalyst include heterogeneous catalysts such as a catalyst containing a noble metal supported on a porous inorganic substance; and homogeneous catalysts such as a catalyst obtained by reacting a solubilized salt of nickel, cobalt or the like with organic aluminum or the like, and a catalyst using metallocene such as titanocene. Among these catalysts, from the viewpoint that a mild hydrogenation condition can be selected, a titanocene catalyst is preferably used.

In addition, hydrogenation of an aromatic group can be performed by using a noble metal-supported catalyst.

Examples of the hydrogenation catalyst include, but are not limited to, (1) a supported heterogeneous hydrogenation catalyst obtained by supporting a metal such as Ni, Pt, Pd or Ru on carbon, silica, alumina or diatomite, (2) what is called a ziegler catalyst using an organic acid salt of Ni, Co, Fe, Cr or the like, or a transition metal salt such as acetylacetone salt, and a reducing agent such as organic aluminum, and (3) what is called an organic metal complex such as an organic metal compound of Ti, Ru, Rh or Zr. Furthermore, examples of the hydrogenation catalyst include known hydrogenation catalysts described in, for example, Japanese Patent Publication No. 42-8704, Japanese Patent Publication No. 43-6636, Japanese Patent Publication No. 63-4841, Japanese Patent Publication No. 1-37970, Japanese Patent Publication No. 1-53851, Japanese Patent Publication No. 2-9041 and Japanese Patent Laid-Open No. 8-109219. A preferable hydrogenation catalyst is a reaction mixture of a titanocene compound and a reducing organic metal compound.

In the method for producing the conjugated diene-based polymer of the present embodiment, a deactivator, a neutralizer or the like may be added if necessary to the resultant polymer solution after the reaction step.

Examples of the deactivator include, but are not limited to, water; and alcohols such as methanol, ethanol and isopropanol.

Examples of the neutralizer include, but are not limited to, carboxylic acids such as stearic acid, oleic acid and versatic acid (a mixture of highly branched carboxylic acids having 9 to 11 carbon atoms, mainly 10 carbon atoms); and an aqueous solution of an inorganic acid, and a carbon dioxide gas.

To the conjugated diene-based polymer of the present embodiment, from the viewpoint of preventing gel formation after the polymerization and of improving stability in the processing, a stabilizer for rubber is preferably added.

As the stabilizer for rubber, any of known stabilizers, not limited to the following, can be used, and preferable examples include antioxidants such as 2,6-di-tert-butyl-4-hydroxytoluene (BHT), n-octadecyl-3-(4'-hydroxy-3',5'-di-tert-butylphenol)propionate, and 2-methyl-4,6-bis[(octylthio)methyl]phenol.

(Extended Conjugated Diene-Based Polymer)

An extended conjugated diene-based polymer of the present embodiment contains the conjugated diene-based polymer of the present embodiment described above, and at least any one selected from the group consisting of an extender oil, a liquid rubber, and a resin.

It is noted that the extended conjugated diene-based polymer encompasses not only an extended conjugated diene-based polymer containing an oil but also one containing a liquid polybutadiene excluding an oil, or any of various resins.

Thus, the processability of the conjugated diene-based polymer can be further improved.

A preferable example of a method for adding an extender oil to the conjugated diene-based polymer includes, but is not limited to, a method in which an extender oil is added to a conjugated diene-based polymer solution to be mixed, and the resultant extended polymer solution is desolvated.

Examples of the extender oil include an aroma oil, a naphthenic oil and a paraffin oil. Among these oils, from the viewpoint of environmental safety, oil bleeding prevention and wet grip characteristics, an aroma-alternative oil containing 3% by mass or less of a polycyclic aromatic (PCA) component according to the IP 346 is preferred. Examples of the aroma-alternative oil include TDAE (Threated Distillate Aromatic Extracts), MES (Mild Extraction Solvate) and the like mentioned in Kautschuk Gummi Kunststoffe 52 (12) 799 (1999), and RAE (Residual Aromatic Extracts).

Examples of the liquid rubber include, but are not limited to, liquid polybutadiene and liquid styrene-butadiene rubber.

Examples of the resin include, but are not limited to, an aromatic petroleum resin, a coumarone-indene resin, a terpene-based resin, a rosin derivative (including a wood oil resin), tall oil, a derivative of tall oil, a rosin ester resin, a natural or synthetic terpene resin, an aliphatic hydrocarbon resin, an aromatic hydrocarbon resin, a mixed aliphatic/aromatic hydrocarbon resin, a coumarin-indene resin, a phenol resin, a p-tert-butylphenol-acetylene resin, a phenol-formaldehyde resin, a xylene-formaldehyde resin, a monoolefin oligomer, a diolefin oligomer, an aromatic hydrocarbon resin, an aromatic petroleum resin, a hydrogenated aromatic hydrocarbon resin, a cyclic aliphatic hydrocarbon resin, a hydrogenated hydrocarbon resin, a hydrocarbon resin, a hydrogenated wood oil resin, a hydrogenated oil resin, and an ester of a hydrogenated oil resin and a monofunctional or polyfunctional alcohol.

One of these resins may be singly used, or two or more of these may be used together. When hydrogenated, all unsaturated groups may be hydrogenated, or some may be left not hydrogenated.

The amount to be added of at least any one selected from the group consisting of an extender oil, a liquid rubber and a resin is not limited, and is preferably 1 to 60 parts by mass, more preferably 10 to 60 parts by mass, and further preferably 15 to 37.5 parts by mass based on 100 parts by mass of the conjugated diene-based polymer of the present embodiment.

(Desolvation Step)

As a method for obtaining the conjugated diene-based polymer of the present embodiment from the polymer solution, any of know methods can be employed. Examples of the method include a method in which the conjugated diene-based polymer is filtered after separating the solvent by steam stripping or the like, and the resultant is dehydrated and dried to obtain the conjugated diene-based polymer, a method in which the solution is concentrated in a flushing tank, and the resultant is devolatilized by using a bent extruder or the like, and a method in which the solution is directly devolatilized by using a drum dryer or the like.

[Rubber Composition]

A rubber composition of the present embodiment contains a rubber component, and 5.0 parts by mass or more and 150 parts by mass or less of a filler based on 100 parts by mass of the rubber component.

From the viewpoints of fuel efficiency performance, processability and improvement of abrasion resistance, the rubber component contains, based on a total amount (100% by mass) of the rubber component, 10% by mass or more of the above-described conjugated diene-based polymer of the present embodiment, or the extended conjugated diene-based polymer of the present embodiment.

The filler preferably contains a silica-based inorganic filler.

If a silica-based inorganic filler is dispersed in the rubber composition of the present embodiment, the rubber composition tends to be more excellent in processability obtained when used for obtaining a vulcanizate and tends to be more excellent in balance between a low hysteresis loss property and wet skid resistance, abrasion resistance and fracture strength when in the form of a vulcanizate.

Also when the rubber composition of the present embodiment is to be used in application to a vulcanized rubber such as a tire, a vehicle component such as an anti-vibration rubber, or shoes, a silica-based inorganic filler is preferably contained.

In the rubber composition of the present embodiment, a rubber-like polymer different from the conjugated diene-based polymer of the present embodiment (hereinafter simply referred to as the "rubber-like polymer") may be contained in combination with the conjugated diene-based polymer of the present embodiment.

Examples of such a rubber-like polymer include, but are not limited to, a conjugated diene-based polymer or a hydrogenated product thereof, a random copolymer of a conjugated diene-based compound and a vinyl aromatic compound, or a hydrogenated product thereof, a block copolymer of a conjugated diene-based compound and a vinyl aromatic compound, or a hydrogenated product thereof, a non-diene-based polymer and a natural rubber.

Specific examples of the rubber-like polymer include, but are not limited to, a butadiene rubber or a hydrogenated product thereof, an isoprene rubber or a hydrogenated product thereof, styrene-based elastomers such as a styrene-butadiene rubber or a hydrogenated product thereof, and a styrene-butadiene block copolymer or a hydrogenated product thereof, a styrene-isoprene block copolymer or a hydrogenated product thereof, and an acrylonitrile-butadiene rubber or a hydrogenated product thereof.

Examples of the non-diene-based polymer include, but are not limited to, olefin-based elastomers such as an ethylene-propylene rubber, an ethylene-propylene-diene rubber, an ethylene-butene-diene rubber, an ethylene-butene rubber, an ethylene-hexene rubber and an ethylene-octene rubber, a butyl rubber, a brominated butyl rubber, an acrylic rubber, a fluorine rubber, a silicone rubber, a chlorinated polyethylene rubber, an epichlorohydrin rubber, an $\alpha,\beta$-unsaturated nitrile-acrylic acid ester-conjugated diene copolymer rubber, a urethane rubber and a polysulfide rubber.

Examples of the natural rubber include, but are not limited to, smoked sheets of RSS Nos. 3 to 5, SMR and epoxidized natural rubber.

The above-described various rubber-like polymers may be in the form of a modified rubber imparted with a functional group having polarity such as a hydroxyl group or an amino group. For use in a tire, a butadiene rubber, an isoprene rubber, a styrene-butadiene rubber, a natural rubber and a butyl rubber are preferably used.

The weight average molecular weight of the rubber-like polymer is, from the viewpoint of balance between performance and processing characteristics, preferably 2,000 or more and 2,000,000 or less, and more preferably 5,000 or more and 1,500,000 or less. Besides, a rubber-like polymer having a low molecular weight, namely, what is called a liquid rubber, can be used. One of these rubber-like polymers may be singly used, or two or more of these may be used together.

In the rubber composition containing the conjugated diene-based polymer of the present embodiment and the rubber-like polymer, a content ratio (in a mass ratio) of the conjugated diene-based polymer of the present embodiment to the rubber-like polymer is, in terms of (the conjugated diene-based polymer of the present embodiment/the rubber-like polymer), preferably 10/90 or more and 100/0 or less, more preferably 20/80 or more and 90/10 or less, and further preferably 50/50 or more and 80/20 or less.

Accordingly, the rubber component contained in the rubber composition contains, based on the total amount (100 parts by mass) of the rubber component, the conjugated diene-based polymer of the present embodiment in an amount of preferably 10 parts by mass or more and 100 parts by mass or less, more preferably 20 parts by mass or more and 90 parts by mass or less, and further preferably 50 parts by mass or more and 80 parts by mass or less.

If the content ratio of (the conjugated diene-based polymer of the present embodiment/the rubber-like polymer) falls in the above-described range, when in the form of a vulcanizate, balance between a low hysteresis loss property and wet skid resistance is excellent, abrasion resistance is excellent, and fracture strength is good.

Examples of the filler contained in the rubber composition of the present embodiment include, but are not limited to, a silica-based inorganic filler, carbon black, a metal oxide, and a metal hydroxide. Among these, a silica-based inorganic filler is preferred.

One of these fillers may be singly used, or two or more of these may be used together.

A content of the filler in the rubber composition of the present embodiment is 5.0 parts by mass or more and 150 parts by mass or less, preferably 20 parts by mass or more and 100 parts by mass or less, and further preferably 30 parts by mass or more and 90 parts by mass or less based on 100 parts by mass of the rubber component containing the conjugated diene-based polymer of the present embodiment.

From the viewpoint of exhibiting the effect of the filler addition, the content of the filler is 5.0 parts by mass or more, and from the viewpoint that the filler is sufficiently dispersed to attain practically sufficient processability and mechanical strength of the rubber composition, the content is 150 parts by mass or less.

The silica-based inorganic filler is not especially limited, any of known fillers can be used, a solid particle containing $SiO_2$ or $Si_3Al$ as a constituent unit is preferred, and a solid particle containing $SiO_2$ or $Si_3Al$ as a principal component of a constituent unit is more preferred. Here, the principal component refers to a component contained in the silica-based inorganic filler in an amount of 50% by mass or more, preferably 70% by mass or more, and more preferably 80% by mass or more.

Examples of the silica-based inorganic filler include, but are not limited to, silica, clay, talc, mica, diatomite, wollastonite, montmorillonite, zeolite and inorganic fibrous substances such as glass fiber.

Besides, examples include a silica-based inorganic filler having a hydrophobized surface, and a mixture of a silica-based inorganic filler and an inorganic filler excluding silica. Among these, from the viewpoint of strength and abrasion resistance, silica and glass fiber are preferred, and silica is more preferred. Examples of the silica include dry silica, wet silica and synthetic silicate silica. Among these silica, wet silica is preferred from the viewpoint that it is excellent in the effect of improving fracture characteristics and balance in wet skid resistance.

From the viewpoint of obtaining practically good abrasion resistance and fracture characteristics of the rubber composition, a nitrogen adsorption specific surface area, obtained by the BET adsorption method, of the silica-based inorganic filler is preferably 100 $m^2/g$ or more and 300 $m^2/g$ or less, and more preferably 170 $m^2/g$ or more and 250 $m^2/g$ or less. Besides, a silica-based inorganic filler having a comparatively small specific surface area (for example, a specific surface area of 200 $m^2/g$ or less) and a silica-based inorganic filler having a comparatively large specific surface area (for example, 200 $m^2/g$ or more) can be used in combination if necessary.

If a silica-based inorganic filler having a comparatively large specific surface area (of, for example, 200 $m^2/g$ or more) is used in particular, the conjugated diene-based polymer of the present embodiment tends to be improved in dispersibility of silica, and be effective particularly in improvement of abrasion resistance, and be capable of well-balanced in good fracture characteristics and a low hysteresis loss property.

A content of the silica-based inorganic filler in the rubber composition of the present embodiment is preferably 5.0 parts by mass or more and 150 parts by mass or less, more preferably 20 parts by mass or more and 100 parts by mass or less based on 100 parts by mass of the rubber component containing the conjugated diene-based polymer of the present embodiment. From the viewpoint of exhibiting the effect of the addition of the silica-based inorganic filler, the content of the silica-based inorganic filler is 5.0 parts by mass or more, and from the viewpoint that the silica-based inorganic filler is sufficiently dispersed to attain practically sufficient processability and mechanical strength of the rubber composition, the content is 150 parts by mass or less.

Examples of the carbon black include, but are not limited to, carbon blacks of SRF, FEF, HAF, ISAF and SAF classes. Among these, a carbon black having a nitrogen adsorption specific surface area of 50 $m^2/g$ or more and dibutyl phthalate (DBP) oil absorption of 80 mL/100 g or less is preferred.

A content of the carbon black is preferably 0.5 parts by mass or more and 100 parts by mass or less, more preferably 3.0 parts by mass or more and 100 parts by mass or less, and further preferably 5.0 parts by mass or more and 50 parts by mass or less based on 100 parts by mass of the rubber component containing the conjugated diene-based polymer of the present embodiment. From the viewpoint of exhibiting performances required in use as a tire or the like such as dry grip performance and conductivity, the content of the carbon black is preferably 0.5 parts by mass or more, and from the viewpoint of dispersibility, the content is preferably 100 parts by mass or less.

The metal oxide refers to a solid particle containing a principal component of a constituent unit represented by chemical formula MxOy (wherein M represents a metal atom, and x and y each independently represent an integer of 1 to 6).

Examples of the metal oxide include, but are not limited to, alumina, titanium oxide, magnesium oxide and zinc oxide.

Examples of the metal hydroxide include, but are not limited to, aluminum hydroxide, magnesium hydroxide and zirconium hydroxide.

The rubber composition of the present embodiment may contain a silane coupling agent.

The silane coupling agent is preferably a compound that has a function to make close the interaction between the rubber component and the inorganic filler, has a group having affinity with or a binding property to both of the rubber component, and particularly, the silica-based inorganic filler, and contains, in one molecule, a sulfur bond portion and an alkoxysilyl group or silanol group portion. Examples of such a compound include bis-[3-(triethoxysilyl)-propyl]-tetrasulfide, bis-[3-(triethoxysilyl)-propyl]-disulfide and bis-[2-(triethoxysilyl)-ethyl]-tetrasulfide.

A content of the silane coupling agent is preferably 0.1 parts by mass or more and 30 parts by mass or less, more preferably 0.5 parts by mass or more and 20 parts by mass or less, and further preferably 1.0 part by mass or more and 15 parts by mass or less based on 100 parts by mass of the filler. If the content of the silane coupling agent falls in the aforementioned range, there is a tendency that the effect of the addition of the silane coupling agent can be more conspicuous.

The rubber composition of the present embodiment may contain a rubber softener from the viewpoint of improvement of the processability.

As the rubber softener, a mineral oil or a liquid or low molecular weight synthetic softener is suitably used.

A mineral oil-based rubber softener, which is used for softening, expanding and improving processability of a rubber and is designated as a process oil or an extender oil, is a mixture of an aromatic ring, a naphthene ring and a paraffin chain, and one in which the number of carbon atoms of the paraffin chain is 50% or more of the number of all carbon atoms is designated as a paraffin-based softener, one in which the number of carbon atoms of the naphthene ring is 30% or more and 45% or less of the number of all carbon atoms is designated as a naphthene-based softener, and one in which the number of aromatic carbon atoms exceeds 30% of the number of all carbon atoms is designated as an aromatic-based softener.

When the conjugated diene-based polymer of the present embodiment is a copolymer of a conjugated diene compound and an aromatic vinyl compound, a rubber softener to be used is preferably one having an appropriate aromatic content because such a softener tends to fit with the copolymer.

A content of the rubber softener is preferably 0 part by mass or more and 100 parts by mass or less, more preferably 10 parts by mass or more and 90 parts by mass or less, and further preferably 30 parts by mass or more and 90 parts by mass or less based on 100 parts by mass of the rubber component containing the conjugated diene-based polymer of the present embodiment. If the content of the rubber softener is 100 parts by mass or less based on 100 parts by mass of the rubber component, there is a tendency that the bleeding out is suppressed and the stickiness of the surface of the rubber composition of the present embodiment is suppressed.

Examples of a method for mixing the constituent materials of the rubber composition of the present embodiment, such as the rubber component containing the conjugated diene-based polymer of the present embodiment, a silica-based inorganic filler, carbon black or another filler, a silane coupling agent, and an additive such as a rubber softener, include, but are not limited to, a melt-kneading method using a general mixer such as an open roll, a banbury mixer, a kneader, a single shaft screw extruder, a twin shaft screw extruder or a multi-shaft screw extruder, and a method in which the respective components are melted and mixed followed by removal of a solvent by heating.

Among these methods, the melt-kneading method using a roll, a banbury mixer, a kneader or an extruder is preferred from the viewpoint of productivity and high kneadability. Besides, either of a method in which the constituent materials of the rubber composition of the present embodiment are kneaded all together or a method in which the materials are mixed dividedly in plural times is applicable.

The rubber composition of the present embodiment may be a vulcanized composition having been vulcanized with a vulcanizing agent. Examples of the vulcanizing agent include, but are not limited to, radical generators such as organic peroxides and azo compounds, oxime compounds, nitroso compounds, polyamine compounds, sulfur and sulfur compounds.

The sulfur compounds include sulfur monochloride, sulfur dichloride, disulfide compounds and high molecular weight polysulfide compounds.

A content of the vulcanizing agent is preferably 0.01 parts by mass or more and 20 parts by mass or less, and more preferably 0.1 parts by mass or more and 15 parts by mass or less based on 100 parts by mass of the rubber component containing the conjugated diene-based polymer of the present embodiment. As a vulcanizing method, any of known methods is applicable, and a vulcanization temperature is preferably 120° C. or more and 200° C. or less, and more preferably 140° C. or more and 180° C. or less.

For the vulcanization, a vulcanization accelerator may be used if necessary.

As the vulcanization accelerator, any of known materials can be used, and examples include, but are not limited to, sulphenamide-based, guanidine-based, thiuram-based, aldehyde-amine-based, aldehyde-ammonia-based, thiazole-based, thiourea-based and dithiocarbamate-based vulcanization accelerators.

Besides, examples of a vulcanization aid include, but are not limited to, zinc oxide and stearic acid.

A content of the vulcanization accelerator is preferably 0.01 parts by mass or more and 20 parts by mass or less, and more preferably 0.1 parts by mass or more and 15 parts by mass or less based on 100 parts by mass of the rubber component containing the conjugated diene-based polymer of the present embodiment.

The rubber composition of the present embodiment may contain, as long as the object of the present embodiment is not impaired, various additives such as another softener excluding those described above, a filler, a heat resistance stabilizer, an antistatic agent, a weathering stabilizer, an anti-ageing agent, a colorant and a lubricant.

As another softener, any of known softeners can be used.

Specific examples of another filler include calcium carbonate, magnesium carbonate, aluminum sulfate and barium sulfate.

As each of the heat resistance stabilizer, the antistatic agent, the weathering stabilizer, the anti-ageing agent, the colorant and the lubricant, any of known materials can be used.

[Tire]

The rubber composition of the present embodiment is suitably used as a rubber composition for a tire. In other words, a tire of the present embodiment contains the rubber composition of the present embodiment.

The rubber composition for a tire of the present embodiment is applicable to, but not limited to, various tires such as a fuel-efficient tire, an all-season tire, a high-performance tire and a studless tire; and various tire portions such as a tread, a carcass, a sidewall and a bead. In particular, since the rubber composition for a tire is excellent in the balance between the low hysteresis loss property and the wet skid resistance obtained when in the form of a vulcanizate and in the abrasion resistance, it is more suitably used as a tread of a fuel-efficient tire or a high-performance tire.

EXAMPLES

The present embodiment will now be described in more detail with reference to specific examples and comparative examples, and it is noted that the present embodiment is not limited to the following examples and comparative examples at all.

Various physical properties of the examples and comparative examples were measured by the following methods.

In the following examples and comparative examples, a conjugated diene-based polymer obtained after modification is referred to as the "modified conjugated diene-based polymer". One obtained before the modification is referred to as the "unmodified conjugated diene-based polymer".

(Physical Property 1) Amount of Bound Styrene

One hundred (100) mg of a modified conjugated diene-based polymer used as a sample was dissolved in chloroform to be diluted to 100 mL, and the resultant was used as a measurement sample. Based on the amount of absorption of a phenyl group of styrene at a UV absorption wavelength (about 254 nm), the amount of bound styrene (% by mass) based on 100% by mass of the sample of the modified conjugated diene-based polymer was measured (spectrophotometer "UV-2450" manufactured by Shimadzu Corporation).

(Physical Property 2) Microstructure of Butadiene Portion (Amount of 1,2-Vinyl Bond)

Fifty (50) mg of a modified conjugated diene-based polymer used as a sample was dissolved in 10 mL of carbon disulfide, and the resultant was used as a measurement sample.

A solution cell was used to measure an infrared spectrum in a range of 600 to 1000 $cm^{-1}$, and in accordance with a calculation formula of the Hampton method (R. R. Hampton, Analytical Chemistry 21, 923 (1949)) based on absorbance at a prescribed wavelength, a microstructure of a butadiene portion, namely, an amount of 1,2-vinyl bond (mol %) was obtained (Fourier transform infrared spectrophotometer "FT-IR230" manufactured by JASCO Corporation).

(Physical Property 3) Molecular Weight

Measurement Conditions 1: An unmodified conjugated diene-based polymer or a modified conjugated diene-based polymer used as a sample was measured for a chromatogram using a GPC measurement apparatus (trade name "HLC-8320GPC" manufactured by Tosoh Corporation) including a series of three columns using a polystyrene-based gel as a filler with an RI detector (trade name "HLC8020" manufactured by Tosoh Corporation) used, and on the basis of a calibration curve obtained using standard polystyrene, a weight average molecular weight (Mw), a number average molecular weight (Mn) and a molecular weight distribution (Mw/Mn) were obtained.

As an eluent, THF (tetrahydrofuran) containing 5 mmol/L of triethylamine was used. As the columns, trade name "TSKguardcolumn Super MP(HZ)-H" manufactured by Tosoh Corporation connected, as a guard column at a previous stage, to a series of three columns of trade name "TSKgel Super Multipore HZ-H" manufactured by Tosoh Corporation were used.

Ten (10) mg of a sample for the measurement was dissolved in 10 mL of THF to obtain a measurement solution, and 10 µL of the measurement solution was injected into the GPC measurement apparatus for performing the measurement under conditions of an oven temperature of 40° C. and a THF flow rate of 0.35 mL/min.

Among various samples having been subjected to the measurement under the above-described measurement conditions 1, a sample having a molecular weight distribution (Mw/Mn) less than 1.6 was subjected again to the measurement under measurement conditions 2 described below.

With respect to samples having been subjected to the measurement under the measurement conditions 1 and found to have a molecular weight distribution of 1.6 or more, results obtained by the measurement under the measurement conditions 1 are shown in Tables 1 to 3.

Measurement Conditions 2: An unmodified conjugated diene-based polymer or a modified conjugated diene-based polymer used as a sample was measured for a chromatogram using a GPC measurement apparatus including a series of three columns using a polystyrene-based gel as a filler, and on the basis of a calibration curve obtained using standard polystyrene, a weight average molecular weight (Mw), and a number average molecular weight (Mn) were obtained.

As an eluent, THF containing 5 mmol/L of triethylamine was used. As the columns, a guard column of trade name "TSKguardcolumn Super H-H" manufactured by Tosoh Corporation, and columns of trade names "TSKgel SuperH5000", "TSKgel SuperH6000", and "TSKgel SuperH7000" manufactured by Tosoh Corporation were used.

An RI detector (trade name "HLC8020" manufactured by Tosoh Corporation) was used under conditions of an oven temperature of 40° C. and a THF flow rate of 0.6 mL/min. Ten (10) mg of a sample for the measurement was dissolved in 20 mL of THF to obtain a measurement solution, and 20 µL of the measurement solution was injected into the GPC measurement apparatus for performing the measurement.

With respect to a sample having been subjected to the measurement under the measurement conditions 1 and found to have a molecular weight distribution less than 1.6, results obtained by the measurement under the measurement conditions 2 are shown in Tables 1 to 3.

(Physical Property 4) Contracting Factor (g')

A modified conjugated diene-based polymer was used as a sample, and a GPC measurement apparatus (trade name "GPCmax VE-2001" manufactured by Malvern Panalytical Ltd.) including a series of three columns using a polystyrene-based gel as a filler was used. The measurement was performed by using three detectors, that is, a light scattering detector, an RI detector, and a viscosity detector (trade name "TDA305" manufactured by Malvern Panalytical Ltd.) connected in the stated order, so as to obtain, based on standard polystyrene, an absolute molecular weight from results obtained by the light scattering detector and the RI detector, and an intrinsic viscosity from results obtained by the RI detector and the viscosity detector.

A straight-chain polymer was used under assumption of having an intrinsic viscosity [η] of $-3.883 \, M^{0.771}$, and a contracting factor (g') was calculated as a ratio in the intrinsic viscosity to each molecular weight.

As an eluent, THF containing 5 mmol/L of triethylamine was used.

As the columns, a series of columns of trade names "TSKgel G4000HXL", "TSKgel G5000HXL" and "TSKgel G6000HXL" manufactured by Tosoh Corporation were connected and used.

Twenty (20) mg of a sample for the measurement was dissolved in 10 mL of THF to obtain a measurement solution, and 100 µL of the measurement solution was injected into the GPC measurement apparatus for performing the measurement under conditions of an oven temperature of 40° C. and a THF flow rate of 1 mL/min.

(Physical Property 5) Mooney Viscosity of Polymer

An unmodified conjugated diene-based polymer or a modified conjugated diene-based polymer was used as a sample to measure a Mooney viscosity by using a Mooney viscometer (trade name "VR1132" manufactured by Ueshima Seisakusho Co., Ltd.) in accordance with JIS K6300 with an L-type rotor used.

A measurement temperature was 110° C. when an unmodified conjugated diene-based polymer was used as a sample, and was 100° C. when a modified conjugated diene-based polymer was used as a sample.

First, a sample was preheated at the test temperature for 1 minute, the rotor was rotated at 2 rpm, and a torque was measured 4 minutes after as a Mooney viscosity ($ML_{(1+4)}$).

(Physical Property 6) Glass Transition Temperature (Tg)

A modified conjugated diene-based polymer was used as a sample, a differential scanning calorimeter "DSC3200S" manufactured by Mac Science was used to record a DSC curve under flow of helium at 50 mL/min, with a temperature increased from −100° C. at 20° C./min in accordance with ISO 22768:2006, and a peak top (an inflection point) of a DSC differential curve thus obtained was defined as a glass transition temperature.

(Physical Property 7) Modification Ratio

A modified conjugated diene-based polymer was used as a sample, and the measurement was performed by applying a characteristic that a modified basic polymer component adsorbs onto a GPC column using a silica-based gel as a filler.

A modification ratio was obtained by measuring an amount of adsorption onto a silica-based column based on a difference between a chromatogram measured by using a polystyrene-based column and a chromatogram measured by using a silica-based column obtained from a sample solution containing a sample and low molecular weight internal standard polystyrene.

Specifically, the measurement was performed as described below.

A sample found to have a molecular weight distribution of 1.6 or more by the measurement under the measurement conditions 1 of (Physical Property 3) was measured under the following measurement conditions 3. A sample found to have a molecular weight distribution less than 1.6 by the measurement under the measurement conditions 1 of (Physical Property 3) was measured under the following measurement conditions 4. Results are shown in Tables 1 to 3.

Preparation of Sample Solution: Ten (10) mg of a sample and 5 mg of standard polystyrene were dissolved in 20 mL of THF to obtain a sample solution.

Measurement Conditions 3: GPC measurement conditions using polystyrene-based column:

An apparatus of trade name "HLC-8320GPC" manufactured by Tosoh Corporation was used, THF containing 5 mmol/L of triethylamine was used as an eluent, and 10 µL of the sample solution was injected into the apparatus to obtain a chromatogram using an RI detector under conditions of a column oven temperature of 40° C. and a THF flow rate of 0.35 mL/min.

As the columns, a series of three columns of trade name "TSKgel Super Multipore HZ-H" and a guard column of trade name "TSKguardcolumn SuperMP(HZ)-H" manufactured by Tosoh Corporation connected at a previous stage were used.

Measurement Conditions 4: GPC measurement conditions using polystyrene-based column:

An apparatus of trade name "HLC-8320GPC" manufactured by Tosoh Corporation was used, THF containing 5 mmol/L of triethylamine was used as an eluent, and 20 µL of the sample solution was injected into the apparatus to perform the measurement.

As the columns, a guard column of trade name "TSKguardcolumn Super H-H" manufactured by Tosoh Corporation and columns of trade names "TSKgel Super H5000", "TSKgel Super H6000", and "TSKgel Super H7000" manufactured by Tosoh Corporation were used. A chromatogram was obtained by performing the measurement by using an RI detector (HLC8020, manufactured by Tosoh Corporation) under conditions of a column oven temperature of 40° C. and a THF flow rate of 0.6 mL/min.

GPC measurement conditions using silica-based column:

An apparatus of trade name "HLC-8320GPC" manufactured by Tosoh Corporation was used, THF was used as an eluent, and 50 µL of the sample solution was injected into the apparatus to obtain a chromatogram by using an RI detector under conditions of a column oven temperature of 40° C. and a THF flow rate of 0.5 mL/min. A series of columns of trade names "Zorbax PSM-1000S", "PSM-300S" and "PSM-60S", and a guard column of trade name "DIOL 4.6×12.5 mm 5 micron" connected at a previous stage were used.

Calculation Method for Modification Ratio:

Assuming that the whole peak area of the chromatogram obtained by using the polystyrene-based column was 100, that a peak area of the sample was P1, that a peak area of standard polystyrene was P2, that the whole peak area of the chromatogram obtained by using the silica-based column was 100, that a peak area of the sample was P3, and that a peak area of standard polystyrene was P4, a modification ratio (%) was obtained in accordance with the following expression:

$$\text{Modification ratio (\%)} = [1 - (P2 \times P3)/(P1 \times P4)] \times 100$$

wherein P1+P2=P3+P4=100.

(Physical Property 8) Branch Number (Bn)

A modified conjugated diene-based polymer was used as a sample, and a GPC measurement apparatus (trade name "GPCmax VE-2001" manufactured by Malvern Panalytical Ltd.) including a series of three columns using a polystyrene-based gel as a filler was used. The measurement was performed by using three detectors, that is, a light scattering detector, an RI detector, and a viscosity detector (trade name "TDA305" manufactured by Malvern Panalytical Ltd.) connected in the stated order. Based on standard polystyrene, an absolute molecular weight was obtained from results obtained by using the light scattering detector and the RI detector, and an intrinsic viscosity was obtained from results obtained by using the RI detector and the viscosity detector.

A straight-chain polymer was used under assumption of having an intrinsic viscosity [η] of −3.883 $M^{0.771}$, and a contracting factor (g') was calculated as a ratio in the intrinsic viscosity to each molecular weight.

Thereafter, the thus obtained contracting factor (g') was used to calculate a branch number (Bn) defined as g'=6 Bn/{(Bn+1) (Bn+2)}.

As an eluent, THF containing 5 mmol/L of triethylamine was used.

As the columns, a series of columns of trade names "TSKgel G4000HXL", "TSKgel G5000HXL" and "TSKgel G6000HXL" manufactured by Tosoh Corporation were connected and used.

Twenty (20) mg of a sample for the measurement was dissolved in 10 mL of THF to obtain a measurement solution, and 100 µL of the measurement solution was injected into the GPC measurement apparatus for performing the measurement under conditions of an oven temperature of 40° C. and a THF flow rate of 1 mL/min.

(Physical Property 9) Molecular Weight (Absolute Molecular Weight) Obtained by GPC-Light Scattering Measurement A modified conjugated diene-based polymer was used as a sample, and a GPC-light scattering measurement apparatus including a series of three columns using a polystyrene-based gel as a filler was used to measure a chromatogram for obtaining a weight average molecular weight (Mw-i) (also designated as an "absolute molecular weight") based on the viscosity of a solution and a light scattering method.

As an eluent, a mixed solution of tetrahydrofuran and triethylamine (THF in TEA: prepared by mixing 5 mL of triethylamine in 1 L of tetrahydrofuran) was used.

As the columns, a series of a guard column of trade name "TSKguardcolumn HHR-H" manufactured by Tosoh Corporation, and columns of trade names "TSKgel G6000HHR", "TSKgel G5000HHR", and "TSKgel G4000HHR" were connected and used.

A GPC-light scattering measurement apparatus (trade name "Viscotek TDAmax" manufactured by Malvern Panalytical Ltd.) was used under conditions of an oven temperature of 40° C. and a THF flow rate of 1.0 mL/min.

Ten (10) mg of a sample for measurement was dissolved in 20 mL of THF to obtain a measurement solution, and 200 μL of the measurement solution was injected into the GPC measurement apparatus for the measurement.

(Example 1) Modified Conjugated Diene-Based Polymer (Sample 1)

Two tank pressure vessels, each of which is a stirrer-equipped tank reactor having an internal volume of 10 L and a ratio (L/D) of internal height (L) and diameter (D) of 4.0, having an inlet at a bottom and an outlet at a top, and equipped with a stirrer and a temperature controlling jacket, were connected to each other as polymerization reactors.

1,3-Butadiene, styrene and n-hexane, from which a water content had been precedently removed were mixed under conditions of 18.6 g/min, 10.0 g/min and 175.2 g/min, respectively. In a static mixer provided in the middle of a pipe for supplying the thus obtained mixed solution to the inlet of the reactor, n-butyllithium to be used for residual impurity inactivation was added and mixed in an amount of 0.103 mmol/min, and the resultant was continuously supplied to the bottom of the reactor. Besides, 2,2-bis(2-oxolanyl)propane used as a polar material and n-butyllithium used as a polymerization initiator were supplied, at rates of respectively 0.081 mmol/min and 0.143 mmol/min, to the bottom of the first reactor in which materials were vigorously mixed by the stirrer, and the internal temperature of the reactor was kept at 67° C.

The thus obtained polymer solution was continuously taken out from the top of the first reactor to be continuously supplied to the bottom of the second reactor for continuing the reaction at 70° C., and the resultant was further supplied to a static mixer from the top of the second reactor. When the polymerization was sufficiently stabilized, trimethoxy(4-vinylphenyl)silane (shown as "BS-1" in a table) used as a branching agent was added at a rate of 0.0190 mmol/min from the bottom of the second reactor. When the polymerization reaction and the branching reaction were stabilized, a small amount of a conjugated diene-based polymer solution prior to addition of a modifier was taken out, an antioxidant (BHT) was added thereto in an amount of 0.2 g per 100 g of the polymer, then the solvent was removed, and a Mooney viscosity at 110° C. and various molecular weights were measured. The other physical properties are also shown in Table 1.

Next, to the polymer solution flowing out of an outlet of the reactor, 2,2-dimethoxy-1-(3-trimethoxysilylpropyl)-1-aza-2-silacyclopentane (shown as "A" in the table) was added, as a modifier, continuously at a rate of 0.0360 mmol/min, and the resultant was mixed by using a static mixer for performing a modification reaction. Here, a time until the addition of the modifier to the polymer solution flowing out of the outlet of the reactor was 4.8 min, the temperature was 68° C., and a difference between the temperature in the polymerizing step and the temperature until the addition of the modifier was 2° C. To the polymer solution having been subjected to the modification reaction, an antioxidant (BHT) was added in an amount of 0.2 g per 100 g of the polymer continuously at 0.055 g/min (n-hexane solution) to complete the modification reaction. Simultaneously with the antioxidant, an oil (JOMO Process NC 140, manufactured by JX Nippon Oil & Energy Corporation) was continuously added in an amount of 37.5 g per 100 g of the polymer, and the resultant was mixed by using a static mixer. The solvent was removed by steam stripping, and thus, a modified conjugated diene-based polymer (sample 1) was obtained. Physical properties of the sample 1 are shown in Table 1.

(Example 2) Modified Conjugated Diene-Based Polymer (Sample 2)

A modified conjugated diene-based polymer (sample 2) was obtained in the same manner as in Example 1 except that the modifier was changed from 2,2-dimethoxy-1-(3-trimethoxysilylpropyl)-1-aza-2-silacyclopentane to tris(3-trimethoxysilylpropyl)amine (shown as "B" in the table"), and that the amount thereof to be added was changed to 0.0250 mmol/min. Physical properties of the sample 2 are shown in Table 1.

(Example 3) Modified Conjugated Diene-Based Polymer (Sample 3)

A modified conjugated diene-based polymer (sample 3) was obtained in the same manner as in Example 1 except that the modifier was changed from 2,2-dimethoxy-1-(3-trimethoxysilylpropyl)-1-aza-2-silacyclopentane to tetrakis(3-trimethoxysilylpropyl)-1,3-propanediamine (shown as "C" in the table"), and that the amount thereof to be added was changed to 0.0190 mmol/min. Physical properties of the sample 3 are shown in Table 1.

(Example 4) Modified Conjugated Diene-Based Polymer (Sample 4)

A modified conjugated diene-based polymer (sample 4) was obtained in the same manner as in Example 1 except that the modifier was changed from 2,2-dimethoxy-1-(3-trimethoxysilylpropyl)-1-aza-2-silacyclopentane to tetrakis(3-trimethoxysilylpropyl)-1,3-propanediamine (shown as "C" in the table"), and that the amount thereof to be added was changed to 0.0160 mmol/min. Physical properties of the sample 4 are shown in Table 1.

(Example 5) Modified Conjugated Diene-Based Polymer (Sample 5)

A modified conjugated diene-based polymer (sample 5) was obtained in the same manner as in Example 1 except that the branching agent was changed from trimethoxy(4-vinylphenyl)silane to dimethylmethoxy(4-vinylphenyl)silane (shown as "BS-2" in the table), and that the amount thereof to be added was changed to 0.0350 mmol/min. Physical properties of the sample 5 are shown in Table 1.

(Example 6) Modified Conjugated Diene-Based Polymer (Sample 6)

A modified conjugated diene-based polymer (sample 6) was obtained in the same manner as in Example 1 except that the branching agent was changed from trimethoxy(4-vinylphenyl)silane to dimethylmethoxy(4-vinylphenyl)silane (shown as "BS-2" in the table), that the amount thereof to be added was changed to 0.0350 mmol/min, that the modifier was changed from 2,2-dimethoxy-1-(3-trimethoxysilylpropyl)-1-aza-2-silacyclopentane to tris(3-trimethoxysilylpropyl)amine (shown as "B" in the table"), and that the amount thereof to be added was changed to 0.0250 mmol/min. Physical properties of the sample 6 are shown in Table 1.

(Example 7) Modified Conjugated Diene-Based Polymer (Sample 7)

A modified conjugated diene-based polymer (sample 7) was obtained in the same manner as in Example 1 except that the branching agent was changed from trimethoxy(4-vinylphenyl)silane to dimethylmethoxy(4-vinylphenyl)silane (shown as "BS-2" in the table), that the amount thereof to be added was changed to 0.0350 mmol/min, that the modifier was changed from 2,2-dimethoxy-1-(3-trimethoxysilylpropyl)-1-aza-2-silacyclopentane to tetrakis(3-trimethoxysilylpropyl)-1,3-propanediamine (shown as "C" in the table"), and that the amount thereof to be added was changed to 0.0160 mmol/min. Physical properties of the sample 7 are shown in Table 1.

(Example 8) Modified Conjugated Diene-Based Polymer (Sample 8)

A modified conjugated diene-based polymer (sample 8) was obtained in the same manner as in Example 1 except that the branching agent was changed from trimethoxy(4-vinylphenyl)silane to 1,1-bis(4-dimethylmethoxysilyl)phenyl)ethylene (shown as "BS-3" in the table), and that the amount thereof to be added was changed to 0.0120 mmol/min. Physical properties of the sample 8 are shown in Table 1.

(Example 9) Modified Conjugated Diene-Based Polymer (Sample 9)

A modified conjugated diene-based polymer (sample 9) was obtained in the same manner as in Example 1 except that the branching agent was changed from trimethoxy(4-vinylphenyl)silane to 1,1-bis(4-dimethylmethoxysilyl)phenyl)ethylene (shown as "BS-3" in the table), that the amount thereof to be added was changed to 0.0120 mmol/min, that the modifier was changed from 2,2-dimethoxy-1-(3-trimethoxysilylpropyl)-1-aza-2-silacyclopentane to tris(3-trimethoxysilylpropyl)amine (shown as "B" in the table"), and that the amount thereof to be added was changed to 0.0250 mmol/min. Physical properties of the sample 9 are shown in Table 1.

(Example 10) Modified Conjugated Diene-Based Polymer (Sample 10)

A modified conjugated diene-based polymer (sample 10) was obtained in the same manner as in Example 1 except that the branching agent was changed from trimethoxy(4-vinylphenyl)silane to 1,1-bis(4-dimethylmethoxysilyl)phenyl)ethylene (shown as "BS-3" in the table), that the amount thereof to be added was changed to 0.0120 mmol/min, that the modifier was changed from 2,2-dimethoxy-1-(3-trimethoxysilylpropyl)-1-aza-2-silacyclopentane to tetrakis(3-trimethoxysilylpropyl)-1,3-propanediamine (shown as "C" in the table"), and that the amount thereof to be added was changed to 0.0160 mmol/min. Physical properties of the sample 10 are shown in Table 1.

(Example 11) Modified Conjugated Diene-Based Polymer (Sample 11)

A modified conjugated diene-based polymer (sample 11) was obtained in the same manner as in Example 1 except that the branching agent was changed from trimethoxy(4-vinylphenyl)silane to 1,1-bis(4-trimethoxysilylphenyl)ethylene (shown as "BS-4" in the table), and that the amount thereof to be added was changed to 0.0210 mmol/min. Physical properties of the sample 11 are shown in Table 2.

(Example 12) Modified Conjugated Diene-Based Polymer (Sample 12)

A modified conjugated diene-based polymer (sample 12) was obtained in the same manner as in Example 1 except that the branching agent was changed from trimethoxy(4-vinylphenyl)silane to 1,1-bis(4-trimethoxysilylphenyl)ethylene (shown as "BS-4" in the table), that the amount thereof to be added was changed to 0.0210 mmol/min, that the modifier was changed from 2,2-dimethoxy-1-(3-trimethoxysilylpropyl)-1-aza-2-silacyclopentane to tris(3-trimethoxysilylpropyl)amine (shown as "B" in the table"), and that the amount thereof to be added was changed to 0.0250 mmol/min. Physical properties of the sample 12 are shown in Table 2.

(Example 13) Modified Conjugated Diene-Based Polymer (Sample 13)

A modified conjugated diene-based polymer (sample 13) was obtained in the same manner as in Example 1 except that the branching agent was changed from trimethoxy(4-vinylphenyl)silane to 1,1-bis(4-trimethoxysilylphenyl)ethylene (shown as "BS-4" in the table), that the amount thereof to be added was changed to 0.0210 mmol/min, that the modifier was changed from 2,2-dimethoxy-1-(3-trimethoxysilylpropyl)-1-aza-2-silacyclopentane to tetrakis(3-trimethoxysilylpropyl)-1,3-propanediamine (shown as "C" in the table"), and that the amount thereof to be added was changed to 0.0160 mmol/min. Physical properties of the sample 13 are shown in Table 2.

(Example 14) Modified Conjugated Diene-Based Polymer (Sample 14)

A modified conjugated diene-based polymer (sample 14) was obtained in the same manner as in Example 1 except that the branching agent was changed from trimethoxy(4-vinylphenyl)silane to trichloro(4-vinylphenyl)silane (shown as "BS-5" in the table). Physical properties of the sample 14 are shown in Table 2.

(Example 15) Modified Conjugated Diene-Based Polymer (Sample 15)

A modified conjugated diene-based polymer (sample 15) was obtained in the same manner as in Example 1 except that the branching agent was changed from trimethoxy(4-vinylphenyl)silane to trichloro(4-vinylphenyl)silane (shown as "BS-5" in the table), that the modifier was changed from 2,2-dimethoxy-1-(3-trimethoxysilylpropyl)-1-aza-2-silacyclopentane to tris(3-trimethoxysilylpropyl)amine (shown as "B" in the table"), and that the amount thereof to be added was changed to 0.0250 mmol/min. Physical properties of the sample 15 are shown in Table 2.

(Example 16) Modified Conjugated Diene-Based Polymer (Sample 16)

A modified conjugated diene-based polymer (sample 16) was obtained in the same manner as in Example 1 except that the branching agent was changed from trimethoxy(4-vinylphenyl)silane to trichloro(4-vinylphenyl)silane (shown as "BS-5" in the table), that the modifier was changed from 2,2-dimethoxy-1-(3-trimethoxysilylpropyl)-1-aza-2-silacyclopentane to tetrakis(3-trimethoxysilylpropyl)-1,3-propanediamine (shown as "C" in the table"), and that the amount thereof to be added was changed to 0.0160 mmol/min. Physical properties of the sample 16 are shown in Table 2.

(Example 17) Modified Conjugated Diene-Based Polymer (Sample 17)

A modified conjugated diene-based polymer (sample 17) was obtained in the same manner as in Example 1 except that the amount of trimethoxy(4-vinylphenyl)silane (shown as "BS-1" in the table) to be added as the branching agent was changed to 0.0100 mmol/min, that the modifier was changed from 2,2-dimethoxy-1-(3-trimethoxysilylpropyl)-1-aza-2-silacyclopentane to tetrakis(3-trimethoxysilylpropyl)-1,3-propanediamine (shown as "C" in the table"), and that the amount thereof to be added was changed to 0.0160 mmol/min. Physical properties of the sample 17 are shown in Table 2.

(Example 18) Modified Conjugated Diene-Based Polymer (Sample 18)

A modified conjugated diene-based polymer (sample 18) was obtained in the same manner as in Example 1 except that the amount of trimethoxy(4-vinylphenyl)silane (shown as "BS-1" in the table) to be added as the branching agent was changed to 0.0250 mmol/min, that the modifier was changed from 2,2-dimethoxy-1-(3-trimethoxysilylpropyl)-1-aza-2-silacyclopentane to tetrakis(3-trimethoxysilylpropyl)-1,3-propanediamine (shown as "C" in the table"), and that the amount thereof to be added was changed to 0.0160 mmol/min. Physical properties of the sample 18 are shown in Table 2.

(Example 19) Modified Conjugated Diene-Based Polymer (Sample 19)

A modified conjugated diene-based polymer (sample 19) was obtained in the same manner as in Example 1 except that the amount of trimethoxy(4-vinylphenyl)silane (shown as "BS-1" in the table) to be added as the branching agent was changed to 0.0350 mmol/min, that the modifier was changed from 2,2-dimethoxy-1-(3-trimethoxysilylpropyl)-1-aza-2-silacyclopentane to tetrakis(3-trimethoxysilylpropyl)-1,3-propanediamine (shown as "C" in the table"), and that the amount thereof to be added was changed to 0.0160 mmol/min. Physical properties of the sample 19 are shown in Table 2.

(Example 20) Conjugated Diene-Based Polymer (Sample 20)

A conjugated diene-based polymer (sample 20) was obtained in the same manner as in Example 1 except that the modifier was changed from 2,2-dimethoxy-1-(3-trimethoxysilylpropyl)-1-aza-2-silacyclopentane to a coupling agent of tetraethoxysilane (shown as "D" in the table"), and that the amount thereof to be added was changed to 0.0250 mmol/min. Physical properties of the sample 20 are shown in Table 2.

(Comparative Example 1) Modified Conjugated Diene-Based Polymer (Sample 21)

Two tank pressure vessels, each of which is a stirrer-equipped tank reactor having an internal volume of 10 L and a ratio (L/D) of internal height (L) and diameter (D) of 4.0, having an inlet at a bottom and an outlet at a top, and equipped with a stirrer and a temperature controlling jacket, were connected to each other as polymerization reactors.

1,3-Butadiene, styrene and n-hexane, from which a water content had been precedently removed were mixed under conditions of 18.6 g/min, 10.0 g/min and 175.2 g/min, respectively. In a static mixer provided in the middle of a pipe for supplying the thus obtained mixed solution to the inlet of the reactor, n-butyllithium to be used for residual impurity inactivation was added and mixed in an amount of 0.103 mmol/min, and the resultant was continuously supplied to the bottom of the reactor. Besides, 2,2-bis(2-oxolanyl)propane used as a polar material and n-butyllithium used as a polymerization initiator were supplied, at rates of respectively 0.081 mmol/min and 0.143 mmol/min, to the bottom of the first reactor in which materials were vigorously mixed by the stirrer, and the internal temperature of the reactor was kept at 67° C.

The thus obtained polymer solution was continuously taken out from the top of the first reactor to be continuously supplied to the bottom of the second reactor for continuing the reaction at 70° C., and the resultant was further supplied to a static mixer from the top of the second reactor. When the polymerization was sufficiently stabilized, a small amount of a polymer solution prior to addition of a modifier was taken out, an antioxidant (BHT) was added thereto in an amount of 0.2 g per 100 g of the polymer, then the solvent was removed, and a Mooney viscosity at 110° C. and various molecular weights were measured. The other physical properties are also shown in Table 3.

Next, to the polymer solution flowing out of an outlet of the reactor, 2,2-dimethoxy-1-(3-trimethoxysilylpropyl)-1-aza-2-silacyclopentane (shown as "A" in the table) was added, as a modifier, continuously at a rate of 0.0360 mmol/min, and the resultant was mixed by using a static mixer for performing a modification reaction. Here, a time until the addition of the modifier to the polymer solution flowing out of the outlet of the reactor was 4.8 min, the temperature was 68° C., and a difference between the temperature in the polymerizing step and the temperature until the addition of the modifier was 2° C. To the polymer solution having been subjected to the modification reaction, an antioxidant (BHT) was added in an amount of 0.2 g per 100 g of the polymer continuously at 0.055 g/min (n-hexane solution) to complete the modification reaction. Simultaneously with the antioxidant, an oil (JOMO Process NC 140, manufactured by JX Nippon Oil & Energy Corporation) was continuously added in an amount of 37.5 g per 100 g of the polymer, and the resultant was mixed by using a static mixer. The solvent was removed by steam stripping, and thus, a modified conjugated diene-based polymer (sample 21) was obtained. Physical properties of the sample 21 are shown in Table 3.

(Comparative Example 2) Modified Conjugated Diene-Based Polymer (Sample 22)

A modified conjugated diene-based polymer (sample 22) was obtained in the same manner as in Comparative Example 1 except that the modifier was changed from 2,2-dimethoxy-1-(3-trimethoxysilylpropyl)-1-aza-2-silacyclopentane to tris(3-trimethoxysilylpropyl)amine (shown as "B" in the table"), and that the amount thereof to be added was changed to 0.0250 mmol/min. Physical properties of the sample 22 are shown in Table 3.

(Comparative Example 3) Branched Modified Diene-Based Polymer (Sample 23)

A modified conjugated diene-based polymer (sample 23) was obtained in the same manner as in Comparative Example 1 except that the modifier was changed from 2,2-dimethoxy-1-(3-trimethoxysilylpropyl)-1-aza-2-silacyclopentane to tetrakis(3-trimethoxysilylpropyl)-1,3-propanediamine (shown as "C" in the table"), and that the amount thereof to be added was changed to 0.0190 mmol/min. Physical properties of the sample 23 are shown in Table 3.

(Comparative Example 4) Branched Modified Diene-Based Polymer (Sample 24)

A modified conjugated diene-based polymer (sample 24) was obtained in the same manner as in Comparative Example 1 except that the amount of 2,2-bis(2-oxolanyl) propane to be added as the polar material was changed to a rate of 0.105 mmol/min, that the amount of n-butyllithium to be added as the polymerization initiator was changed to a rate of 0.188 mmol/min, that the amount of trimethoxy(4-vinylphenyl)silane (shown as "BS-1" in the table) to be added as the branching agent was changed to 0.0350 mmol/min, and that the amount of 2,2-dimethoxy-1-(3-trimethoxysilylpropyl)-1-aza-2-silacyclopentane to be added as the modifier was changed to 0.0510 mmol/min. Physical properties of the sample 24 are shown in Table 3.

(Comparative Example 5) Modified Conjugated Diene-Based Polymer (Sample 25)

One tank pressure vessel, which is a stirrer-equipped tank reactor having an internal volume of 0.5 L and a ratio (L/D) of internal height (L) and diameter (D) of 4.0, having an inlet at a bottom and an outlet at a top, equipped with a stirrer and a temperature controlling jacket, and two tank pressure vessels, each of which is a stirrer-equipped tank reactor having an internal volume of 10 L and a ratio (L/D) of internal height (L) and diameter (D) of 4.0, having an inlet at a bottom and an outlet at a top, and equipped with a stirrer and a temperature controlling jacket, were connected to one another, namely, three reactors in total were connected, as polymerization reactors.

n-Hexane, from which a water content had been precedently removed, 2,2-bis(2-oxolanyl)propane used as the polar material, n-butyllithium used as the polymerization initiator, and n-butyllithium to be used for residual impurity inactivation were added under conditions of 175.2 g/min, at a rate of 0.081 mmol/min, at a rate of 0.143 mmol/min, and 0.103 mmol/min, respectively, and trimethoxy(4-vinylphenyl)silane (shown as "BS-1" in the table") was added thereto as the branching agent at a rate of 0.0190 mmol/min. The resultant was vigorously mixed by the stirrer, and the internal temperature of the reactor was kept at 67° C. to construct a polymer block component.

The thus obtained polymer solution was continuously taken out from the top of the first reactor, and continuously supplied to the bottom of the second reactor, and 1,3-butadiene and styrene, from which a water content had been precedently removed were supplied from the bottom of the second reactor under conditions of 18.6 g/min and 10.0 g/min, respectively, and mixed.

The reaction was continued at 70° C., and the resultant polymer solution was continuously taken out from the top of the second reactor, continuously supplied to the bottom of the third reactor, and further supplied to a static mixer from the top of the third reactor. The thus obtained mixed solution was supplied to a static mixer provided in the middle of a pipe for supply to the inlet of the third reactor. When the polymerization was sufficiently stabilized, a small amount of a polymer solution prior to addition of a modifier was taken out, an antioxidant (BHT) was added thereto in an amount of 0.2 g per 100 g of the polymer, then the solvent was removed, and a Mooney viscosity at 110° C. and various molecular weights were measured. The other physical properties are also shown in Table 3.

Next, to the polymer solution flowing out of an outlet of the reactor, 2,2-dimethoxy-1-(3-trimethoxysilylpropyl)-1-aza-2-silacyclopentane (shown as "A" in the table) was added, as a modifier, continuously at a rate of 0.0360 mmol/min, and the resultant was mixed by using a static mixer for performing a modification reaction. Here, a time until the addition of the modifier to the polymer solution flowing out of the outlet of the reactor was 4.8 min, the temperature was 68° C., and a difference between the temperature in the polymerizing step and the temperature until the addition of the modifier was 2° C. To the polymer solution having been subjected to the modification reaction, an antioxidant (BHT) was added in an amount of 0.2 g per 100 g of the polymer continuously at 0.055 g/min (n-hexane solution) to complete the modification reaction. Simultaneously with the antioxidant, an oil (JOMO Process NC 140, manufactured by JX Nippon Oil & Energy Corporation) was continuously added in an amount of 37.5 g per 100 g of the polymer, and the resultant was mixed by using a static mixer. The solvent was removed by steam stripping, and thus, a modified conjugated diene-based polymer (sample 25) was obtained. Physical properties of the sample 25 are shown in Table 3.

TABLE 1

|  |  |  | Example 1 | Example 2 | Example 3 | Example 4 | Example 5 |
|---|---|---|---|---|---|---|---|
| Modified Conjugated Diene-based Polymer (Sample No.) |  |  | 1 | 2 | 3 | 4 | 5 |
| Polymerization Conditions | Butadiene |  (g/min) | 18.6 | 18.6 | 18.6 | 18.6 | 18.6 |
|  | Styrene | (g/min) | 10.0 | 10.0 | 10.0 | 10.0 | 10.0 |
|  | n-Hexane | (g/min) | 175.2 | 175.2 | 175.2 | 175.2 | 175.2 |
|  | Polymerization Temperature | (° C.) | 70 | 70 | 70 | 70 | 70 |
|  | n-Butyllithium for Treatment | (mmol/min) | 0.103 | 0.103 | 0.103 | 0.103 | 0.103 |
|  | n-Butyllithium of Polymerization Initiator | (mmol/min) | 0.143 | 0.143 | 0.143 | 0.143 | 0.143 |
|  | Amount of Polar Material Added | (mmol/min) | 0.081 | 0.081 | 0.081 | 0.081 | 0.081 |
|  | Branching Agent Type |  | BS-1 | BS-1 | BS-1 | BS-1 | BS-2 |
|  | Branching Agent Amount Added | (mmol/min) | 0.0190 | 0.0190 | 0.0190 | 0.0190 | 0.0350 |
|  | Modifier Type |  | A | B | C | C | A |
|  | Modifier Amount Added | (mmol/min) | 0.0360 | 0.0250 | 0.0190 | 0.0160 | 0.0360 |
| Physical Properties | Conjugated Diene-based Polymer | (Physical Property 3) Weight Average Molecular Weight | ($10^4$ g/mol) | 63.9 | 63.9 | 63.9 | 63.9 | 60.3 |
|  |  | (Physical Property 3) Number Average Molecular Weight | ($10^4$ g/mol) | 33.1 | 33.1 | 33.1 | 33.1 | 32.2 |
|  |  | (Physical Property 4) Mooney Viscosity (110° C.) |  | 92.1 | 92.1 | 92.1 | 92.1 | 88.2 |
|  |  | (Physical Property 3) Mw/Mn |  | 1.93 | 1.93 | 1.93 | 1.93 | 1.87 |
|  | Modified Conjugated Diene-based Polymer | (Physical Property 1) Amount of Bound Styrene | (mass %) | 35 | 35 | 35 | 35 | 35 |
|  |  | (Physical Property 2) Amount of Bound Vinyl (Amount of 1,2-Bond) | (mol %) | 40 | 40 | 40 | 40 | 40 |
|  |  | (Physical Property 3) Weight Average Molecular Weight | ($10^4$ g/mol) | 92.0 | 96.0 | 105.3 | 106.0 | 86.8 |
|  |  | (Physical Property 3) Number Average Molecular Weight | ($10^4$ g/mol) | 46.7 | 48.7 | 53.4 | 54.6 | 43.8 |
|  |  | (Physical Property 3) Mw/Mn |  | 1.97 | 1.97 | 1.97 | 1.94 | 1.98 |
|  |  | (Physical Property 4) Contracting Factor (g') |  | 0.52 | 0.40 | 0.32 | 0.26 | 0.53 |
|  |  | (Physical Property 5) Mooney Viscosity of Polymer (100° C.) |  | 83 | 83 | 83 | 82 | 79 |
|  |  | (Physical Property 6) Glass Transition Temperature | (° C.) | −23 | −23 | −23 | −23 | −23 |
|  |  | (Physical Property 7) Modification Ratio | (%) | 88 | 86 | 86 | 82 | 85 |
|  |  | (Physical Property 8) Branch Number Bn | per molecule | 8.7 | 12.0 | 15.8 | 20.0 | 8.0 |
|  |  | (Physical Property 9) Absolute Molecular Weight (Mw-i) | ($10^4$ Daltons) | 144 | 170 | 186 | 281 | 136 |

|  |  |  | Example 6 | Example 7 | Example 8 | Example 9 | Example 10 |
|---|---|---|---|---|---|---|---|
| Modified Conjugated Diene-based Polymer (Sample No.) |  |  | 6 | 7 | 8 | 9 | 10 |
| Polymerization Conditions | Butadiene | (g/min) | 18.6 | 18.6 | 18.6 | 18.6 | 18.6 |
|  | Styrene | (g/min) | 10.0 | 10.0 | 10.0 | 10.0 | 10.0 |
|  | n-Hexane | (g/min) | 175.2 | 175.2 | 175.2 | 175.2 | 175.2 |
|  | Polymerization Temperature | (° C.) | 70 | 70 | 70 | 70 | 70 |
|  | n-Butyllithium for Treatment | (mmol/min) | 0.103 | 0.103 | 0.103 | 0.103 | 0.103 |
|  | n-Butyllithium of Polymerization Initiator | (mmol/min) | 0.143 | 0.143 | 0.143 | 0.143 | 0.143 |
|  | Amount of Polar Material Added | (mmol/min) | 0.081 | 0.081 | 0.081 | 0.081 | 0.081 |
|  | Branching Agent Type |  | BS-2 | BS-2 | BS-3 | BS-3 | BS-3 |
|  | Branching Agent Amount Added | (mmol/min) | 0.0350 | 0.0350 | 0.0120 | 0.0120 | 0.0120 |
|  | Modifier Type |  | B | C | A | B | C |
|  | Modifier Amount Added | (mmol/min) | 0.0250 | 0.0160 | 0.0360 | 0.0250 | 0.0160 |
| Physical Properties | Conjugated Diene-based Polymer | (Physical Property 3) Weight Average Molecular Weight | ($10^4$ g/mol) | 60.3 | 60.3 | 74.5 | 74.5 | 74.5 |
|  |  | (Physical Property 3) Number Average Molecular Weight | ($10^4$ g/mol) | 32.2 | 32.2 | 37.8 | 37.8 | 37.8 |
|  |  | (Physical Property 4) Mooney Viscosity (110° C.) |  | 88.2 | 88.2 | 99.1 | 99.1 | 99.1 |
|  |  | (Physical Property 3) Mw/Mn |  | 1.87 | 1.87 | 1.97 | 1.97 | 1.97 |
|  | Modified Conjugated Diene-based Polymer | (Physical Property 1) Amount of Bound Styrene | (mass %) | 35 | 35 | 35 | 35 | 35 |
|  |  | (Physical Property 2) Amount of Bound Vinyl (Amount of 1,2-Bond) | (mol %) | 40 | 40 | 40 | 40 | 40 |
|  |  | (Physical Property 3) Weight Average Molecular Weight | ($10^4$ g/mol) | 90.6 | 99.4 | 115.0 | 121.0 | 135.0 |
|  |  | (Physical Property 3) Number Average Molecular Weight | ($10^4$ g/mol) | 46.5 | 51.5 | 57.2 | 62.4 | 69.6 |
|  |  | (Physical Property 3) Mw/Mn |  | 1.95 | 1.93 | 2.01 | 1.94 | 1.94 |
|  |  | (Physical Property 4) Contracting Factor (g') |  | 0.45 | 0.37 | 0.28 | 0.21 | 0.18 |
|  |  | (Physical Property 5) Mooney Viscosity of Polymer (100° C.) |  | 84 | 82 | 81 | 84 | 82 |
|  |  | (Physical Property 6) Glass Transition Temperature | (° C.) | −23 | −23 | −23 | −23 | −23 |

TABLE 1-continued

|  |  |  | | | | | |
|---|---|---|---|---|---|---|---|
| (Physical Property 7) Modification Ratio | (%) | | 84 | 81 | 82 | 84 | 85 |
| (Physical Property 8) Branch Number Bn | per molecule | | 10.0 | 13.0 | 18.0 | 26.0 | 30.0 |
| (Physical Property 9) Absolute Molecular Weight (Mw-i) | ($10^4$ Daltons) | | 160 | 176 | 160 | 203 | 334.8 |

TABLE 2

| | | | | Example 11 | Example 12 | Example 13 | Example 14 | Example 15 |
|---|---|---|---|---|---|---|---|---|
| Modified Conjugated Diene-based Polymer (Sample No.) | | | | 11 | 12 | 13 | 14 | 15 |
| Polymerization Conditions | Butadiene | | (g/min) | 18.6 | 18.6 | 18.6 | 18.6 | 18.6 |
| | Styrene | | (g/min) | 10.0 | 10.0 | 10.0 | 10.0 | 10.0 |
| | n-Hexane | | (g/min) | 175.2 | 175.2 | 175.2 | 175.2 | 175.2 |
| | Polymerization Temperature | | (° C.) | 70 | 70 | 70 | 70 | 70 |
| | n-Butyllithium for Treatment | | (mmol/min) | 0.103 | 0.103 | 0.103 | 0.103 | 0.103 |
| | n-Butyllithium of Polymerization Initiator | | (mmol/min) | 0.143 | 0.143 | 0.143 | 0.143 | 0.143 |
| | Amount of Polar Material Added | | (mmol/min) | 0.081 | 0.081 | 0.081 | 0.081 | 0.081 |
| | Branching Agent | Type | | BS-4 | BS-4 | BS-4 | BS-5 | BS-5 |
| | | Amount Added | (mmol/min) | 0.0210 | 0.0210 | 0.0210 | 0.0190 | 0.0190 |
| | Modifier | Type | | A | B | C | A | B |
| | | Amount Added | (mmol/min) | 0.0360 | 0.0250 | 0.0160 | 0.0360 | 0.0250 |
| Physical Properties | Conjugated Diene-based Polymer | (Physical Property 3) Weight Average Molecular Weight | ($10^4$ g/mol) | 61.5 | 61.5 | 61.5 | 63.9 | 63.9 |
| | | (Physical Property 3) Number Average Molecular Weight | ($10^4$ g/mol) | 31.1 | 31.1 | 31.1 | 33.1 | 33.1 |
| | | (Physical Property 4) Mooney Viscosity (110° C.) | | 90.6 | 90.6 | 90.6 | 92.1 | 92.1 |
| | | (Physical Property 3) Mw/Mn | | 1.98 | 1.98 | 1.98 | 1.93 | 1.93 |
| | Modified Conjugated Diene-based Polymer | (Physical Property 1) Amount of Bound Styrene | (mass %) | 35 | 35 | 35 | 35 | 35 |
| | | (Physical Property 2) Amount of Bound Vinyl (Amount of 1,2-Bond) | (mol %) | 40 | 40 | 40 | 40 | 40 |
| | | (Physical Property 3) Weight Average Molecular Weight | ($10^4$ g/mol) | 91.0 | 94.0 | 102.3 | 92.0 | 96.0 |
| | | (Physical Property 3) Number Average Molecular Weight | ($10^4$ g/mol) | 46.0 | 48.2 | 51.9 | 46.7 | 48.7 |
| | | (Physical Property 3) Mw/Mn | | 1.98 | 1.95 | 1.97 | 1.97 | 1.97 |
| | | (Physical Property 4) Contracting Factor (g') | | 0.51 | 0.41 | 0.35 | 0.52 | 0.40 |
| | | (Physical Property 5) Mooney Viscosity of Polymer (100° C.) | | 82 | 83 | 84 | 83 | 83 |
| | | (Physical Property 6) Glass Transition Temperature | (° C.) | −23 | −23 | −23 | −23 | −23 |
| | | (Physical Property 7) Modification Ratio | (%) | 82 | 84 | 62 | 88 | 86 |
| | | (Physical Property 8) Branch Number Bn | per molecule | 8.5 | 11.5 | 14.2 | 8.7 | 12.0 |
| | | (Physical Property 9) Absolute Molecular Weight (Mw-i) | ($10^4$ Daltons) | 135 | 165 | 184 | 144 | 170 |

| | | | | Example 16 | Example 17 | Example 18 | Example 19 | Example 20 |
|---|---|---|---|---|---|---|---|---|
| Modified Conjugated Diene-based Polymer (Sample No.) | | | | 16 | 17 | 18 | 19 | 20 |
| Polymerization Conditions | Butadiene | | (g/min) | 18.6 | 18.6 | 18.6 | 18.6 | 18.6 |
| | Styrene | | (g/min) | 10.0 | 10.0 | 10.0 | 10.0 | 10.0 |
| | n-Hexane | | (g/min) | 175.2 | 175.2 | 175.2 | 175.2 | 175.2 |
| | Polymerization Temperature | | (° C.) | 70 | 70 | 70 | 70 | 70 |
| | n-Butyllithium for Treatment | | (mmol/min) | 0.103 | 0.103 | 0.103 | 0.103 | 0.103 |
| | n-Butyllithium of Polymerization Initiator | | (mmol/min) | 0.143 | 0.143 | 0.143 | 0.143 | 0.143 |
| | Amount of Polar Material Added | | (mmol/min) | 0.081 | 0.081 | 0.081 | 0.081 | 0.081 |
| | Branching Agent | Type | | BS-5 | BS-1 | BS-1 | BS-1 | BS-1 |
| | | Amount Added | (mmol/min) | 0.0190 | 0.0100 | 0.0250 | 0.0350 | 0.0190 |
| | Modifier | Type | | C | C | C | C | D |
| | | Amount Added | (mmol/min) | 0.0190 | 0.0160 | 0.0160 | 0.0160 | 0.0250 |
| Physical Properties | Conjugated Diene-based Polymer | (Physical Property 3) Weight Average Molecular Weight | ($10^4$ g/mol) | 63.9 | 55.9 | 78.6 | 89.3 | 63.9 |
| | | (Physical Property 3) Number Average Molecular Weight | ($10^4$ g/mol) | 33.1 | 28.5 | 40.1 | 45.1 | 33.1 |
| | | (Physical Property 4) Mooney Viscosity (110° C.) | | 92.1 | 88.1 | 98.1 | 105.3 | 92.1 |
| | | (Physical Property 3) Mw/Mn | | 1.93 | 1.96 | 1.96 | 1.98 | 1.93 |
| | Modified Conjugated Diene-based Polymer | (Physical Property 1) Amount of Bound Styrene | (mass %) | 35 | 35 | 35 | 35 | 35 |
| | | (Physical Property 2) Amount of Bound Vinyl (Amount of 1,2-Bond) | (mol %) | 40 | 40 | 40 | 40 | 40 |
| | | (Physical Property 3) Weight Average Molecular Weight | ($10^4$ g/mol) | 105.3 | 98.1 | 117.0 | 125.0 | 95.8 |

TABLE 2-continued

|  |  |  | | | | | |
|---|---|---|---|---|---|---|---|
| (Physical Property 3) Number Average Molecular Weight | ($10^4$ g/mol) | | 53.4 | 50.6 | 59.7 | 62.2 | 48.4 |
| (Physical Property 3) Mw/Mn | | | 1.97 | 1.94 | 1.96 | 2.01 | 1.98 |
| (Physical Property 4) Contracting Factor (g') | | | 0.32 | 0.38 | 0.21 | 0.18 | 0.40 |
| (Physical Property 5) Mooney Viscosity of Polymer (100° C.) | | | 83 | 87 | 90 | 92 | 80 |
| (Physical Property 6) Glass Transition Temperature | (° C.) | | −23 | −23 | −23 | −23 | −23 |
| (Physical Property 7) Modification Ratio | (%) | | 86 | 92 | 75 | 68 | 0 |
| (Physical Property 8) Branch Number Bn | per molecule | | 15.8 | 12.5 | 25.3 | 30.1 | 12.0 |
| (Physical Property 9) Absolute Molecular Weight (Mw-i) | ($10^4$ Daltons) | | 186 | 245 | 320 | 360 | 158 |

TABLE 3

| | | | | | Comparative Example 1 | Comparative Example 2 | Comparative Example 3 | Comparative Example 4 | Comparative Example 5 |
|---|---|---|---|---|---|---|---|---|---|
| Modified Conjugated Diene-based Polymer (Sample No.) | | | | | 21 | 22 | 23 | 24 | 25 |
| Polymerization Conditions | Butadiene | | | (g/min) | 18.6 | 18.6 | 18.6 | 18.6 | 18.6 |
| | Styrene | | | (g/min) | 10.0 | 10.0 | 10.0 | 10.0 | 10.0 |
| | n-Hexane | | | (g/min) | 175.2 | 175.2 | 175.2 | 175.2 | 175.2 |
| | Polymerization Temperature | | | (° C.) | 70 | 70 | 70 | 70 | 70 |
| | n-Butyllithium for Treatment | | | (mmol/min) | 0.103 | 0.103 | 0.103 | 0.103 | 0.103 |
| | n-Butyllithium of Polymerization Initiator | | | (mmol/min) | 0.143 | 0.143 | 0.143 | 0.188 | 0.143 |
| | Amount of Polar Material Added | | | (mmol/min) | 0.081 | 0.081 | 0.081 | 0.105 | 0.081 |
| | Branching | Type | | | — | — | — | BS-1 | BS-1 |
| | Agent | Amount Added | | (mmol/min) | — | — | — | 0.0350 | 0.0190 |
| | Modifier | Type | | | A | B | C | A | A |
| | | Amount Added | | (mmol/min) | 0.0360 | 0.0250 | 0.0190 | 0.0510 | 0.0360 |
| Physical Properties | Conjugated Diene-based Polymer | (Physical Property 3) Weight Average Molecular Weight | | ($10^4$ g/mol) | 48.9 | 48.9 | 48.9 | 18.9 | 49.0 |
| | | (Physical Property 3) Number Average Molecular Weight | | ($10^4$ g/mol) | 27.9 | 27.9 | 27.9 | 9.6 | 28.0 |
| | | (Physical Property 4) Mooney Viscosity (110° C.) | | | 72.5 | 72.5 | 72.5 | 25 | 72.6 |
| | | (Physical Property 3) Mw/Mn | | | 1.75 | 1.75 | 1.75 | 1.97 | 1.75 |
| | Modified Conjugated Diene-based Polymer | (Physical Property 1) Amount of Bound Styrene | | (mass %) | 35 | 35 | 35 | 35 | 35 |
| | | (Physical Property 2) Amount of Bound Vinyl (Amount of 1,2-Bond) | | (mol %) | 40 | 40 | 40 | 40 | 40 |
| | | (Physical Property 3) Weight Average Molecular Weight | | ($10^4$ g/mol) | 82.1 | 94.3 | 117.4 | 27.2 | 82.1 |
| | | (Physical Property 3) Number Average Molecular Weight | | ($10^4$ g/mol) | 40.8 | 47.9 | 53.4 | 13.5 | 40.8 |
| | | (Physical Property 3) Mw/Mn | | | 2.01 | 1.97 | 1.98 | 2.01 | 2.01 |
| | | (Physical Property 4) Contracting Factor (g') | | | 0.91 | 0.74 | 0.56 | 0.52 | 0.91 |
| | | (Physical Property 5) Mooney Viscosity of Polymer (100° C.) | | | 75 | 83 | 96 | 40 | 75 |
| | | (Physical Property 6) Glass Transition Temperature | | (° C.) | −23 | −23 | −23 | −23 | −23 |
| | | (Physical Property 7) Modification Ratio | | (%) | 83 | 86 | 80 | 82 | 83 |
| | | (Physical Property 8) Branch Number Bn | | per molecule | 2.9 | 4.6 | 7.4 | 8.4 | 2.9 |
| | | (Physical Property 9) Absolute Molecular Weight (Mw-i) | | ($10^4$ Daltons) | 96 | 97 | 142 | 38 | 96 |

Examples 21 to 40, and Comparative Examples 6 to 10

The samples 1 to 25 shown in Tables 1 to 3 were respectively used as raw material rubbers to obtain rubber compositions respectively containing the raw material rubbers in accordance with the following composition:

Conjugated diene-based polymer or modified conjugated diene-based polymer (each of the samples 1 to 25): 100 parts by mass (excluding oil)

Silica 1 (trade name "Ultrasil 7000GR", manufactured by Evonik Degussa, nitrogen adsorption specific surface area: 170 m²/g): 50.0 parts by mass Silica 2 (trade name "Zeosil Premium 200MP" manufactured by Rhodia, nitrogen adsorption specific surface area: 220 m²/g): 25.0 parts by mass Carbon black (trade name "Seast KH (N339)", manufactured by Tokai Carbon Co., Ltd.): 5.0 parts by mass Silane coupling agent: (trade name "Si75", manufactured by Evonik Degussa, bis(triethoxysilylpropyl)disulfide): 6.0 parts by mass S-RAE oil (trade name "Process NC140", manufactured by JX Nippon Oil & Energy Corporation): 37.5 parts by mass Zinc oxide: 2.5 parts by mass Stearic acid: 1.0 part by mass Anti-ageing agent (N-(1,3-dimethylbutyl)-N'-phenyl-p-phenylenediamine): 2.0 parts by mass Sulfur: 2.2 parts by mass
Vulcanization accelerator 1 (N-cyclohexyl-2-benzothiazylsulfinamide): 1.7 parts by mass
Vulcanization accelerator 2 (diphenylguanidine): 2.0 parts by mass
Total: 239.4 parts by mass The above-described materials were kneaded by the following method to obtain a rubber composition. A closed kneader (having an internal volume of 0.3 L) equipped with a temperature controller was used to knead, as a first stage of kneading, the raw material rubber (each of the samples 1 to 25), the fillers (silica 1, silica 2 and carbon black), the silane coupling agent, the process oil, zinc oxide and stearic acid under conditions of a filling ratio of 65% and a rotor rotation speed of 30 to 50 rpm. Here, the temperature of the closed kneader was controlled to obtain each rubber composition (compound) at a discharging temperature of 155 to 160° C.

Next, after cooling the compound obtained as described above to room temperature, as a second stage of the kneading, the anti-ageing agent was added thereto, and the resultant was kneaded again to improve dispersibility of the silica. Also in this case, the discharging temperature for the compound was adjusted to 155 to 160° C. by the temperature control of the mixer. After cooling, as a third stage of the kneading, sulfur and the vulcanization accelerators 1 and 2 were added, and the resultant was kneaded by an open roll set to 70° C. Thereafter, the resultant was molded and vulcanized at 160° C. for 20 minutes by a vulcanizing press. The rubber compositions prior to the vulcanization, and the rubber compositions after the vulcanization were evaluated. Specifically, the evaluations were performed as described below. Results are shown in Tables 4 to 6.

(Evaluation 1) Mooney Viscosity of Compound
Each compound obtained after the second stage of the kneading and before the third stage of the kneading was used as a sample to measure a viscosity by using a Mooney viscometer in accordance with JIS K6300-1 after preheating the compound at 130° C. for 1 minute, and after rotating a rotor for 4 minutes at 2 rpm. The thus obtained viscosity was shown as an index obtained assuming that a result of Comparative Example 6 was 100. A smaller index indicates better processability.

(Evaluation 2) Viscoelasticity Parameter
A viscoelasticity testing machine "ARES" manufactured by Rheometric Scientific, Inc. was used to measure a viscoelasticity parameter in a torsion mode. Each measurement value was shown as an index obtained assuming that a result obtained by the rubber composition of Comparative Example 6 was 100. A tan δ measured at 0° C. at a frequency of 10 Hz and strain of 1% was used as an index of wet grip performance. A larger index indicates better wet grip performance. Besides, a tan δ measured at 50° C. at a frequency of 10 Hz and strain of 3% was used as an index of fuel efficiency. A smaller index indicates higher fuel efficiency.

(Evaluation 3) Tensile Strength and Tensile Elongation
Tensile strength and tensile elongation were measured in accordance with a tensile test method according to JIS K6251, and were shown as indexes obtained assuming that results of Comparative Example 6 were 100. A larger index indicates better tensile strength and tensile elongation.

(Evaluation 4) Abrasion Resistance
An Acron abrasion tester (manufactured by Yasuda Seiki Seisakusho, Ltd.) was used to measure an abrasion amount through 1000 rotations at a load of 44.4 N in accordance with JIS K6264-2, and results were shown as indexes obtained assuming that a result of Comparative Example 6 was 100. A larger index indicates better abrasion resistance.

TABLE 4

| | | | Example 21 | Example 22 | Example 23 | Example 24 | Example 25 | Example 26 | Example 27 | Example 28 | Example 29 | Example 30 |
|---|---|---|---|---|---|---|---|---|---|---|---|---|
| Modified Diene-based Polymer (Sample No.) | | | 1 | 2 | 3 | 4 | 5 | 6 | 7 | 8 | 9 | 10 |
| (Physical Property 5) Mooney Viscosity of Modified Diene-based Polymer (100° C.) | | | 83 | 83 | 83 | 82 | 79 | 84 | 82 | 81 | 84 | 82 |
| (Evaluation 1) Mooney Viscosity of Compound (130° C.) | | index | 83 | 85 | 80 | 78 | 84 | 85 | 78 | 78 | 78 | 78 |
| Physical Properties of Vulcanizate | (Evaluation 2) tan δ at 50° C. (strain 3%) | index | 80 | 75 | 70 | 73 | 82 | 83 | 73 | 73 | 75 | 77 |
| | (Evaluation 2) tan δ at 0° C. (strain 1%) | index | 120 | 125 | 130 | 128 | 115 | 120 | 128 | 124 | 120 | 121 |
| | (Evaluation 3) Tensile Strength | index | 110 | 125 | 130 | 140 | 109 | 125 | 130 | 143 | 150 | 155 |
| | (Evaluation 3) Tensile Elongation | index | 120 | 130 | 140 | 145 | 122 | 130 | 145 | 150 | 151 | 151 |
| | (Evaluation 4) Abrasion Resistance | index | 125 | 130 | 140 | 150 | 123 | 130 | 145 | 160 | 162 | 165 |

TABLE 5

| | | | Example 31 | Example 32 | Example 33 | Example 34 | Example 35 | Example 36 | Example 37 | Example 38 | Example 39 | Example 40 |
|---|---|---|---|---|---|---|---|---|---|---|---|---|
| Modified Diene-based Polymer (Sample No.) | | | 11 | 12 | 13 | 14 | 15 | 16 | 17 | 18 | 19 | 20 |
| (Physical Property 5) Mooney Viscosity of Modified Diene-based Polymer (100° C.) | | | 82 | 83 | 84 | 83 | 83 | 83 | 87 | 90 | 92 | 90 |
| (Evaluation 1) Mooney Viscosity of Compound (130° C.) | | index | 89 | 87 | 82 | 86 | 85 | 80 | 82 | 72 | 68 | 100 |
| Physical Properties of Vulcanizate | (Evaluation 2) tan δ at 50° C. (strain 3%) | index | 85 | 80 | 75 | 80 | 75 | 70 | 70 | 83 | 85 | 83 |
| | (Evaluation 2) tan δ at 0° C. (strain 1%) | index | 115 | 120 | 125 | 120 | 125 | 130 | 130 | 115 | 110 | 120 |

TABLE 5-continued

|  |  |  | Example 31 | Example 32 | Example 33 | Example 34 | Example 35 | Example 36 | Example 37 | Example 38 | Example 39 | Example 40 |
|---|---|---|---|---|---|---|---|---|---|---|---|---|
| zate | (Evaluation 3) Tensile Strength | index | 110 | 120 | 125 | 110 | 125 | 130 | 110 | 150 | 160 | 120 |
|  | (Evaluation 3) Tensile Elongation | index | 119 | 130 | 140 | 120 | 130 | 140 | 120 | 149 | 166 | 107 |
|  | (Evaluation 4) Abrasion Resistance | index | 124 | 130 | 140 | 125 | 130 | 140 | 130 | 155 | 160 | 120 |

TABLE 6

|  |  |  | Comparative Example 6 | Comparative Example 7 | Comparative Example 8 | Comparative Example 10 | Comparative Example 11 |
|---|---|---|---|---|---|---|---|
| Modified Diene-based Polymer (Sample No.) |  |  | 21 | 22 | 23 | 24 | 25 |
| (Physical Property 5) Mooney Viscosity of Modified Diene-based Polymer (100° C.) |  |  | 75 | 83 | 96 | 96 | 90 |
| (Evaluation 1) Mooney Viscosity of Compound (130° C.) |  | index | 100 | 98 | 94 | 40 | 101 |
| Physical Properties of Vulcanizate | (Evaluation 2) tanδ at 50° C. (strain 3%) | index | 100 | 90 | 85 | 70 | 102 |
|  | (Evaluation 2) tanδ at 0° C. (strain 1%) | index | 100 | 103 | 109 | 109 | 100 |
|  | (Evaluation 3) Tensile Strength | index | 100 | 95 | 90 | 78 | 100 |
|  | (Evaluation 3) Tensile Elongation | index | 100 | 98 | 92 | 77 | 105 |
|  | (Evaluation 4) Abrasion Resistance | index | 100 | 110 | 115 | 76 | 105 |

As shown in Tables 4 to 6, it was confirmed that Examples 21 to 40 are excellent in balance between wet skid resistance and a low hysteresis loss property when in the form of a vulcanizate, and also excellent in abrasion resistance as compared with Comparative Examples 6 to 11.

It was also confirmed that they have such a low Mooney viscosity of the compound when in the form of a vulcanizate that good processability can be exhibited.

It was also confirmed that they have practically sufficient fracture strength when in the form of a vulcanizate.

This application is based upon the prior Japanese patent application (Japanese Patent Application No. 2018-188604), filed to the Japanese Patent Office on Oct. 3, 2018, the entire contents of which are incorporated herein by reference.

INDUSTRIAL APPLICABILITY

A conjugated diene-based polymer of the present invention is industrially applicable as a material or the like of tire treads, interiors/exteriors of vehicles, anti-vibration rubbers, belts, shoes, foam bodies, and various industrial products.

The invention claimed is:

1. A conjugated diene-based polymer having an absolute molecular weight measured by viscosity detector-equipped GPC-light scattering measurement, of $100 \times 10^4$ or more and $5000 \times 10^4$ or less, and having a branching number (Bn) measured by the viscosity detector-equipped GPC-light scattering measurement, of 8 or more.

2. The conjugated diene-based polymer according to claim 1, having a modification ratio of 60% by mass or more.

3. The conjugated diene-based polymer according to claim 1, wherein the conjugated diene-based polymer is a conjugated diene-based polymer having a star polymer structure having 3 or more branches, wherein
at least one branched chain of the star structure comprises a portion derived from a vinyl-based monomer containing an alkoxysilyl group or a halosilyl group, and
the portion derived from the vinyl-based monomer containing an alkoxysilyl group or a halosilyl group further comprises a main chain branch structure.

4. The conjugated diene-based polymer according to claim 1, wherein
the portion derived from the vinyl-based monomer containing an alkoxysilyl group or a halosilyl group is a monomer unit based on a compound represented by the following formula (1) or (2), and contains a branch point of a polymer chain containing the monomer unit based on the compound represented by the formula (1) or (2), and
at least one end of the conjugated diene-based polymer is coupled by using a coupling agent:

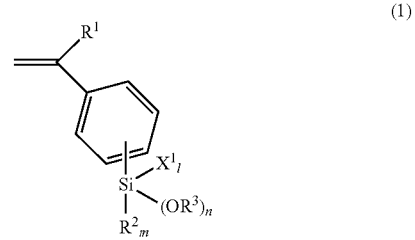

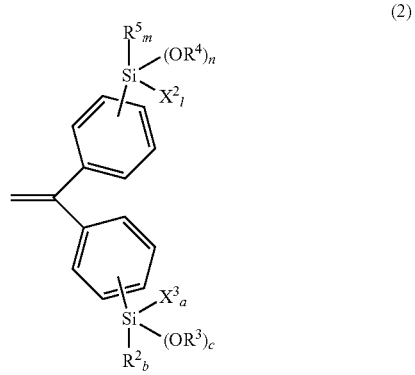

wherein in the formula (1), $R^1$ represents a hydrogen atom, an alkyl group having 1 to 20 carbon atoms, or an aryl group having 6 to 20 carbon atoms, and optionally has a branched alkyl structure in a part of the alkyl group or the aryl group;

$R^2$ and $R^3$ each independently represent an alkyl group having 1 to 20 carbon atoms, or an aryl group having 6 to 20 carbon atoms, and optionally have a branched alkyl structure in a part of the alkyl group or the aryl group;

each of $R^1$ to $R^3$, if present in a plural number, is respectively independent;

$X^1$ represents an independent halogen atom;

m represents an integer of 0 to 2, n represents an integer of 0 to 3, l represents an integer of 0 to 3, and (m+n+l) is 3;

in the formula (2), $R^2$ to $R^5$ each independently represent an alkyl group having 1 to 20 carbon atoms, or an aryl group having 6 to 20 carbon atoms, and optionally have a branched alkyl structure in a part of the alkyl group or the aryl group, and each of $R^2$ to $R^5$, if present in a plural number, is respectively independent;

$X^2$ and $X^3$ represent an independent halogen atom;

m represents an integer of 0 to 2, n represents an integer of 0 to 3, l represents an integer of 0 to 3, and (m+n+l) is 3; and a represents an integer of 0 to 2, b represents an integer of 0 to 3, c represents an integer of 0 to 3, and (a+b+c) is 3.

5. The conjugated diene-based polymer according to claim 4, containing a monomer unit based on a compound represented by the formula (1) wherein $R^1$ is a hydrogen atom, and m is 0.

6. The conjugated diene-based polymer according to claim 4, containing a monomer unit based on a compound represented by the formula (2) wherein m is 0 and b is 0.

7. The conjugated diene-based polymer according to claim 4, containing a monomer unit based on a compound represented by the formula (1) wherein $R^1$ is a hydrogen atom, m is 0, and l is 0.

8. The conjugated diene-based polymer according to claim 4, containing a monomer unit based on a compound represented by the formula (2) wherein m is 0, l is 0, a is 0, and b is 0.

9. The conjugated diene-based polymer according to claim 4, containing a monomer unit based on a compound represented by the formula (1) wherein $R^1$ is a hydrogen atom, l is 0, and n is 3.

10. A branching agent for the conjugated diene-based polymer according to claim 4, wherein the branching agent is a compound represented by the following formula (1) or (2):

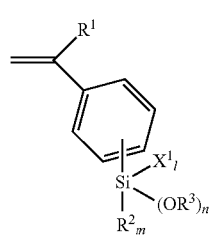
(1)

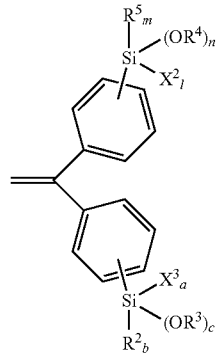
(2)

wherein in the formula (1), $R^1$ represents a hydrogen atom, an alkyl group having 1 to 20 carbon atoms, or an aryl group having 6 to 20 carbon atoms, and optionally has a branched alkyl structure in a part the alkyl group or the aryl group;

$R^2$ and $R^3$ each independently represent an alkyl group having 1 to 20 carbon atoms, or an aryl group having 6 to 20 carbon atoms, and optionally have a branched alkyl structure in a part the alkyl group or the aryl group;

each of $R^1$ to $R^3$, if present in a plural number, is respectively independent;

X1 represents an independent halogen atom;

m represents an integer of 0 to 2, n represents an integer of 0 to 3, l represents an integer of 0 to 3, and (m+n+l) is 3;

in the formula (2), $R^2$ to $R^5$ each independently represent an alkyl group having 1 to 20 carbon atoms, or an aryl group having 6 to 20 carbon atoms, and optionally have a branched alkyl structure in a part the alkyl group or aryl group, and each of $R^2$ to $R^5$, if present in a plural number, is respectively independent;

$X^2$ and $X^3$ represent an independent halogen atom;

m represents an integer of 0 to 2, n represents an integer of 0 to 3, l represents an integer of 0 to 3, and (m+n+l) is 3; and a represents an integer of 0 to 2, b represents an integer of 0 to 3, c represents an integer of 0 to 3, and (a+b+c) is 3.

11. The branching agent according to claim 10, wherein the branching agent is a compound represented by the formula (1) wherein $R^1$ is a hydrogen atom and m is 0.

12. The branching agent according to claim 10, wherein the branching agent is a compound represented by the formula (2) wherein m is 0, and b is 0.

13. The branching agent according to claim 10, wherein the branching agent is a compound represented by the formula (1) wherein $R^1$ is a hydrogen atom, m is 0, and l is 0.

14. The branching agent according to claim 10, wherein the branching agent is a compound represented by the formula (2) wherein m is 0, l is 0, a is 0, and b is 0.

15. The branching agent according to claim 10, wherein the branching agent is a compound represented by the formula (1) wherein $R^1$ is a hydrogen atom, l is 0, and n is 3.

16. An extended conjugated diene-based polymer comprising:
100 parts by mass of the conjugated diene-based polymer according to claim 1; and 1 to 60 parts by mass of at least one selected from the group consisting of an extender oil, a liquid rubber, and a resin.

17. A rubber composition comprising:

a rubber component; and 5.0 parts by mass or more and 150 parts by mass or less of a filler based on 100 parts by mass of the rubber component, wherein the rubber component contains, based on a total amount of the rubber component, 10% by mass or more of the conjugated diene-based polymer according to claim 1.

18. A tire comprising the rubber composition according to claim 17.

* * * * *